(12) United States Patent
Oki et al.

(10) Patent No.: US 6,523,117 B2
(45) Date of Patent: *Feb. 18, 2003

(54) SYSTEM AND METHOD OF ONLINE DECIPHERING DATA ON STORAGE MEDIUM

(75) Inventors: Hiroshi Oki, Kawasaki (JP); Seijun Tanikawa, Kawasaki (JP); Shinji Kamata, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/675,837

(22) Filed: Jul. 5, 1996

(65) Prior Publication Data

US 2002/0032658 A1 Mar. 14, 2002

(51) Int. Cl.$^7$ ................................................. H04L 9/32
(52) U.S. Cl. ..................... 713/189; 713/193; 705/56; 380/44
(58) Field of Search ............................... 380/21, 4, 211, 380/231, 278, 200–202, 233, 277, 44; 713/191, 193, 200, 201, 189, 194; 705/51, 14, 58, 56–60

(56) References Cited

U.S. PATENT DOCUMENTS

| | | | | |
|---|---|---|---|---|
| 4,864,615 A | * | 9/1989 | Bennett et al. | 380/21 |
| 5,072,400 A | * | 12/1991 | Manduley | 700/226 |
| 5,081,676 A | * | 1/1992 | Chou et al. | 380/4 |
| 5,150,411 A | * | 9/1992 | Maurer | 380/30 |
| 5,172,413 A | * | 12/1992 | Bradley et al. | 725/121 |
| 5,235,641 A | * | 8/1993 | Nozawa et al. | 380/21 |
| 5,291,554 A | * | 3/1994 | Morales | 380/5 |
| 5,319,705 A | * | 6/1994 | Halter et al. | 380/4 |
| 5,495,533 A | * | 2/1996 | Linehan et al. | 380/4 |
| 5,586,186 A | * | 12/1996 | Yuval et al. | 380/30 |
| 5,615,264 A | * | 3/1997 | Kazmierczak et al. | 380/4 |

* cited by examiner

Primary Examiner—Gail Hayes
Assistant Examiner—Ho S. Song
(74) Attorney, Agent, or Firm—Staas & Halsey LLP

(57) ABSTRACT

The user mounts a distributed storage medium in his or her terminal unit, selects desired information from stored information, and notifies the host central computer through a network. The host computer generates key information for use in deciphering the selected information by combining the identifier of the selected information, user identification, etc. and sends the key information to a user terminal unit. The user deciphers the selected information according to the transmitted key information, and then accesses the information.

28 Claims, 28 Drawing Sheets

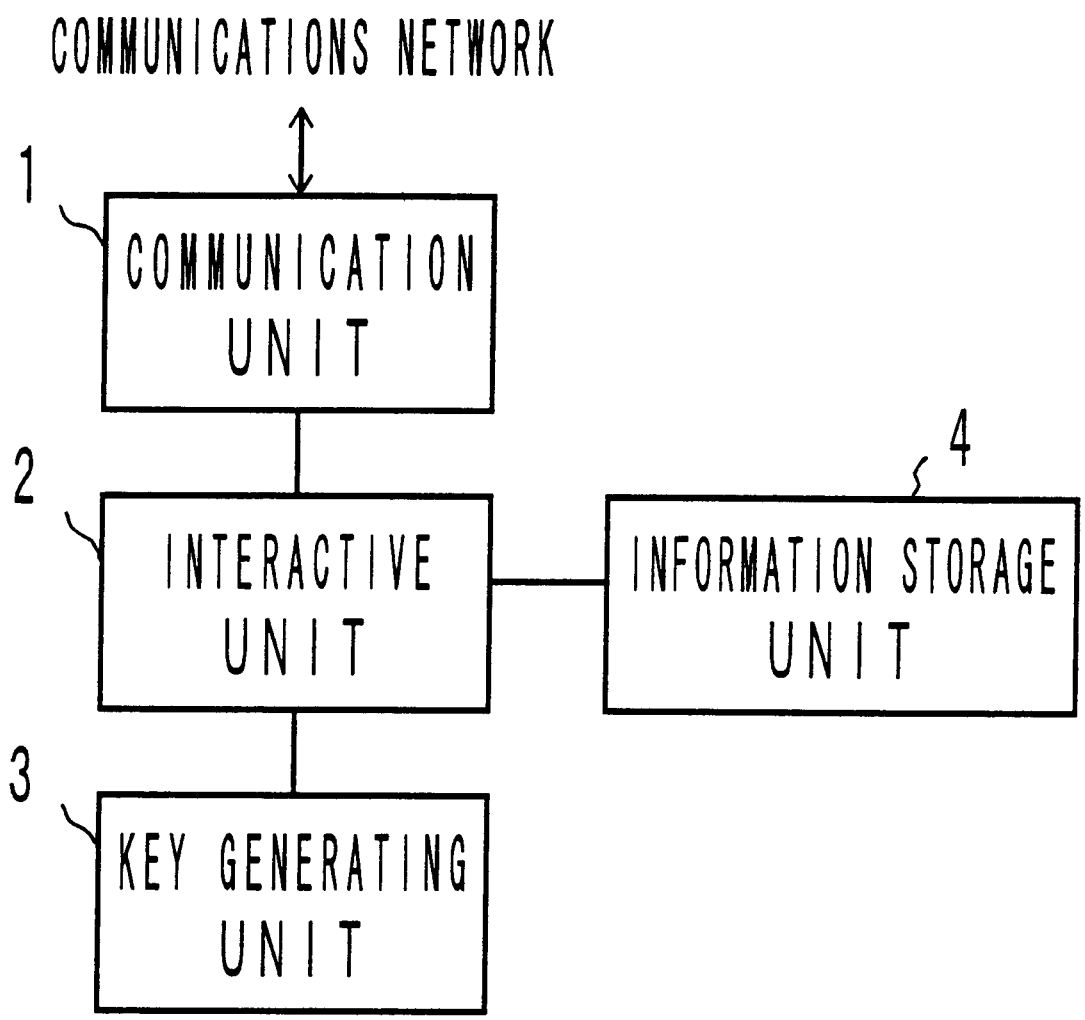
F I G. 1

```
COMPUTER HARDWARE
1. PC-TECH                              2. SOFTLAND
3. PC WORKSHOP                          4. SOFTWARE GARDEN
5. FUJITSU SPECIALTY SHOP "ACCESS"      6. MICROHOUSE
7. GENERAL GOODS OF ELECTRICS           8. PERSONAL COMPUTER SHOP
   "ELECTRIC CLUB"                         "MANKAI"
9. COMPUTER STATION "JCS"              10. VAC FRONTIER ZINDAI SHOP
11. SOFT-CREATE                        12. DOS/V SPECIALITY SHOP
13. LAOX/COMPUTER HOUSE DIRECT             "BLUE STAR"
15. SONY SHOP ELCOM                    14. PINOCCHIO
17. "MEDIA SHUTTLE"                    16. JC-WORLD ONLINE SHOP
>17
WELCOME TO MEDIA SHUTTLE SERVICE              MSHUTTLE(MSH)

1. INFORMATION
2. HOW TO USE SERVICES
3. RECEIVING SERVICE

>3
CONNECTION IS BEING SET. WAIT A MOMENT

THANK YOU FOR TAKING THE MEDIA SHUTTLE.
PLEASE ENJOY THE WIDE SELECTION AND LARGE VOLUME OF VARIOUS
EXCELLENT CONTENTS AND PRODUCTS SPECIFIC TO MEDIA SHUTTLE.
FIRST, INSTALL THE PRODUCTS OF MEDIA SHUTTLE TO YOUR
PERSONAL COMPUTER AS FOLLOWS

>>>>>      HAVE A NICE TRIP !!!   <<<<<
ENTER 1 TO OBTAIN IMPLEMENTATION KEY NUMBER REQUIRED TO INSTALL PRODUCTS.
ENTER 2 TO DISPLAY LIST OF PRODUCTS WHOSE IMPLEMENTATION KEY NUMBERS
HAVE ALREADY BEEN ACQUIRED.  ENTER E TO TERMINATE PROCESS

ENTRY (1 TO ACQUIRE IMPLEMENTATION KEY, 2 TO LIST PRODUCTS,
AND E TO TERMINATE PROCESS)
>1
THERE ARE TWO METHODS TO ACQUIRE IMPLEMENTATION KEY.
/*CAN BE FIXED */
(FOR DETAILS, REFER TO INTRODUCTION DESCRIBED
IN ISSUED OLTJ IN AUGUST, '95)
ENTER 1 TO INPUT DATA ON SCREEN THROUGH KEYBOARD WHILE CHECKING
ALREADY IMPLEMENTED FILES.  ENTER 2 TO FOLLOW TEXT UPLOAD METHOD
ON ALREADY IMPLEMENTED FILES.  ENTER E TO STOP PROCEDURE.
ENTRY (1 TO ENTER THROUGH KEYBOARD, 2 TO UPLOAD TEXT, AND E TO STOP)
```

FIG. 7

```
UPLOAD IMPLEMENTATION FILE IN TEXT MODE

<NIFTY-ID> AAAAAAAA </NIFTY-ID >        /* REQUIRED */
<NAME> MENORU KATO </NAME >
<ZIP > 213 </ZIP>
<ADDR> A-A-A SHINSAKU, TAKATSU-KU, KAWASAKI CITY </ADDR >
<TEL > 044-777-1111 </TEL>
<CDNO> 1234 </CDNO >                    /* REQUIRED */
<ACCNO > 0946-061-921 </ACCNO>          /* REQUIRED */
<PNO > 101 </PNO>                       /* REQUIRED */
<PNO > 205 </PNO>
 /E

/* IF INFORMATION WITH RESPECT TO A NON-REQUIRED ITEM
DOES NOT EXIST, THE ITEM IS DISPLAYED SUCH AS  <NAME> </NAME > */

CONFIRM FOLLOWINGS
   (1) NIFTY-ID:AAAAAAA
   (2) NAME: MENORU KATO
   (3) POST CODE: 213
   (4) ADDRESS: A-A-A, SHINSAKU, TAKATSU-KU, KAWASAKI CITY
   (5) TELEPHONE NUMBER: 044-777-1111
   (6) CD NUMBER: 1234
   (7) ACCESS NUMBER: 0946-061-921
   (8) PRODUCT NUMBER 1: 101     /* DISPLAYED IN 10 LINES */
   (9) PRODUCT NUMBER 2: 201     /* WORK NUMBER IS MAX 899 */

CONFORMATION (1:OK  2:AMEND  E:STOP)
 : 2
ENTER NUMBER TO BE AMENDED

> 2
   (2) NAME: MENORU KATO
   PLEASE ENTER

>MINORU KATO
   (2) NAME:MINORU KATO

CONFIRMATION (1:OK  2:AMEND  E:STOP)
 : 1
FURTHER AMENDMENT ?
AMENDMENT (1:NO   2:YES)
 : 1
```

FIG. 8

```
ENTER YOUR BIRTHDAY (CAN BE SKIPPED BY LINE FEED)
     ENTRY EXAMPLE: 1970/01/01
>1996/08/01
BIRTHDAY: 1966/08/01

CONFIRMATION (1:OK  2:AMEND  E:STOP)
 : 1
ENTER YOUR GENDER ( CAN BE SKIPPED BY LINE FEED)
     SELECTION:  1. MALE   2. FEMALE
>1
GENDER: 1
CONFIRMATION (1:OK  2:AMEND  E:STOP)
 : 1
ENTER MODEL NUMBER OF YOUR PERSONAL COMPUTER
(WITHIN 8 CHINESE CHARACTERS)(CAN BE SKIPPED BY LINE FEED)
>FM-TOWNS-MX

MODEL: FM-TOWNS-MX
CONFIRMATION (1:OK  2:AMEND  E:STOP)
 : 1

ENTER TYPE OF YOUR CREDIT CARD (CAN BE SKIPPED BY LINE FEED)
   TYPE OF CREDIT CARD (1:JCB    2:DC    3:VISA    4:MILLION
                        5:UC     6:CF    7:AMERICAN EXPRESS
                        8:DINERS         9:NIHON SHINPAN   10:JACCS
                        11:ORIENT        12:SEASON         13:NIFTY-ORICO CARD
                        14:NIFTY-JCB CARD)
>1
CREDIT CARD:1
CONFIRMATION (1:OK  2:AMEND  E:STOP)
 : 1

PRODUCT NUMBER IS CONFIRMED AS FOLLOWS
PRODUCT NUMBER              NAME OF PRODUCT
------------------------------------------------
101                         CALC/Win Lite V2.0

CONFIRMATION (1:OK  2:AMEND  E:STOP)
 : 1
```

F I G. 9

```
REQUESTED IMPLEMENTATION KEY No. IS AS FOLLOWS
NOTE IMPLEMENTATION KEY No. BECAUSE IT IS REQUIRED TO INSTALL PRODUCT

IMPLEMENTATION KEY No.      NAME OF PRODUCT
----------------------------------------------------
1234-567-890                CALC/Win Lite V2.0

ENTER IMPLEMENTATION KEY No. FOR CONFIRMATION
: 1234-567-890

CONFIRMED

PRODUCT NUMBER IS TO BE CONFIRMED

PRODUCT NUMBER              NAME OF PRODUCT
----------------------------------------------------
205                         MRDB for Windows V1.1

CONFIRMATION (1:OK  2:AMEND  E:STOP)
: 1

REQUESTED IMPLEMENTATION KEY No. IS AS FOLLOWS
NOTE IMPLEMENTATION KEY No. BECAUSE IT IS REQUIRED TO INSTALL PRODUCT

IMPLEMENTATION KEY No.      NAME OF PRODUCT
----------------------------------------------------
1234-567-891                MRDB for Windows V1.1

ENTER IMPLEMENTATION KEY No. FOR CONFIRMATION
: 1234-567-891

CONFIRMED
```

FIG. 10

REQUESTED PRODUCT IMPLEMENTATION LIST IS AS FOLLOWS

1. NIFTY-ID: AAAAAAA
2. NAME: MINORU KATO
3. POST CODE: 213
4. ADDRESS: A-A-A, SHINSAKU, TAKATSU-KU, KAWASAKI CITY
5. TELEPHONE NUMBER: 044-777-1111
6. CD NUMBER: 1234
7. ACCESS NUMBER: 0946-061-921

| PRODUCT NUMBER | IMPLEMENTATION KEY No. | NAME OF PRODUCT |
|---|---|---|
| 101 | 1234-567-890 | CALC/Win Lite V2.0 |
| 205 | 1234-567-891 | MRDB for Windows V1.1 |

IMPLEMENTATION FEE (XXXX YEN) IS ADDED TO NIFTY-SERVE USE FEE
AND TRANSFERRED FROM YOUR ACCOUNT

THANK YOU FOR YOUR REQUEST

*1 ENTRY (1:ACQUIRE IMPLEMENTATION KEY No.   2:LIST PRODUCTS   E:TERMINATE PROCESS)
>1

F I G. 1 1

```
ENTRY (1:ENTER THROUGH KEYBOARD    2:UPLOAD TEXT    E:STOP)
>1

INTER NIFTY-ID
>AAAAAAA
NIFTY-ID:AAAAAA
CONFIRMATION (1:OK   2:AMEND   E:STOP)
: 1

ENTER YOUR NAME
>MINORU KATO
NAME: MINORU KATO
CONFIRMATION (1:OK   2:AMEND   E:STOP)
: 1
~
  ENTER CD NUMBER
>1234
CD NUMBER:1234
CONFIRMATION (1:OK   2:AMEND   E:STOP)
: 1

ENTER ACCESS NUMBER
>0946-061-921
ACCESS NUMBER:0946-061-921
CONFIRMATION (1:OK   2:AMEND   E:STOP)
: 1

ENTER YOUR BIRTHDAY (CAN BE SKIPPED BY LINE FEED)
       ENTRY EXAMPLE:1970/01/01
>1966/08/01

BIRTHDAY:1966/08/01

CONFIRMATION (1:OK   2:AMEND   E:STOP)
: 1

ENTER YOUR GENDER (CAN BE SKIPPED BY LINE FEED)
         SELECTION: 1.MALE   2.FEMALE
>1

GENDER:1

CONFIRMATION (1:OK   2:AMEND   E:STOP)
: 1
```

FIG. 12

```
ENTER MODEL NUMBER OF YOUR PERSONAL COMPUTER
(WITHIN 8 CHARACTERS)(CAN BE SKIPPED BY LINE FEED)
>FM-TOWNS-MX

MODEL: FM-TOWNS-MX

CONFIRMATION (1:OK  2:AMEND  E:STOP)
 : 1

ENTER TYPE OF YOUR CREDIT CARD (CAN BE SKIPPED BY LINE FEED)
   TYPE OF CREDIT CARD (1:JCB    2:DC    3:VISA   4:MILLION
                        5:UC     6:CF    7:AMERICAN EXPRESS
                        8:DINERS         9:NIHON SHINPAN   10:JACCS
                        11:ORIENT        12:SEASON         13:NIFTY-ORICO CARD
                        14:NIFTY-JCB CARD)
>1

CREDIT CARD:1

CONFIRMATION (1:OK  2:AMEND  E:STOP)
 : 1

ENTER YOUR PRODUCT NUMBER

>101

PRODUCT NUMBER IS CONFIRMED AS FOLLOWS

PRODUCT NUMBER            NAME OF PRODUCT
----------------------------------------------
101                       CALC/Win Lite V2.0

CONFIRMATION (1:OK  2:AMEND  E:STOP)
 : 1
```

FIG. 13

REQUESTED IMPLEMENTATION KEY No. IS AS FOLLOWS
NOTE IMPLEMENTATION KEY No. BECAUSE IT IS REQUIRED TO INSTALL PRODUCT

IMPLEMENTATION KEY No.   NAME OF PRODUCT
----------------------------------------------------
1234-567-890              CALC/Win Lite V2.0

ENTER IMPLEMENTATION KEY No. FOR CONFIRMATION
 : 1234-567-890

CONFIRMED

FURTHER IMPLEMENTATION?
ENTRY (1:FURTHER IMPLEMENT  2:COMPLETE IMPLEMENTATION)

: 1

ENTER PRODUCT NUMBER

SAME AS DESCRIPTIONS ABOVE

FIG. 14

```
ENTRY (1:ENTER THROUGH KEYBOARD   2:UPLOAD TEXT   E:STOP)
>1

ENTER NIFTY-ID
>AAAAAAA
NIFTY-ID:AAAAAA
CONFIRMATION (1:OK   2:AMEND   E:STOP)
:1

PLEASE CONFIRM FOLLOWINGS
   (1) NIFTY-ID:AAAAAA
   (2) NAME: MINORU KATO
   (3) POST CODE: 213
   (4) ADDRESS: A-A-A, SHINSAKU, TAKATSU-KU, KAWASAKI CITY
   (5) TELEPHONE NUMBER: 044-777-1111
   (6) CD NUMBER: 1234
   (7) ACCESS NUMBER: 0946-061-921

CONFORMATION (1:OK   2:AMEND   E:STOP)
:1

ENTER PRODUCT NUMBER

>101

PRODUCT NUMBER IS CONFIRMED AS FOLLOWS

PRODUCT NUMBER              NAME OF PRODUCT
-----------------------------------------------
101                         CALC/Win Lite V2.0

CONFIRMATION (1:OK   2:AMEND   E:STOP)

SUB: ORDER OF ENCIPHERING CD-ROM
TO: CDROMHOST

TRANSMITTED MAIL
 〈NIFTY-ID〉 AAAAAAAA 〈/NIFTY-ID 〉          /* REQUIRED */
 〈NAME〉 MINORU KATO 〈/NAME 〉
 〈ZIP 〉 213 〈/ZIP〉
 〈ADDR〉 A-A-A, SHINSAKU, TAKATSU-KU, KAWASAKI CITY 〈/ADDR 〉
 〈TEL 〉 044-777-1111 〈/TEL〉
 〈CDNO〉 1234 〈/CDNO 〉                      /* REQUIRED */
 〈ACCNO 〉 0946-061-921 〈/ACCNO〉            /* REQUIRED */
 〈PNO 〉 101 〈/PNO〉                         /* REQUIRED */
 〈PNO 〉 205 〈/PNO〉
 /E

RECEIVED MAIL

MR. MINORU KATO
YOUR IMPLEMENTATION KEY No. ARE LISTED BELOW

PRODUCT NUMBER    IMPLEMENTATION KEY No.    NAME OF PRODUCT
-------------------------------------------------------------
101               1234-567-890              CALC/Win Lite V2.0
205               1234-567-891              MRDB for Windows V1.1

F I G. 1 6

```
PRODUCT NUMBER IS CONFIRMED AS FOLLOWS

THIS SOFTWARE HAS ALREADY BEEN UPDATED
IF THIS IS ACCEPTED, PLEASE PURCHASE THIS SORTWARE

PRODUCT NUMBER            NAME OF PRODUCT
-----------------------------------------------

001                   CALC/Win Lite V2.0

CONFIRMATION (1:OK   2:AMEND   E:STOP)
: E
```

F I G. 1 8

REQUESTED IMPLEMENTATION KEY No. IS AS FOLLOWS
NOTE IMPLEMENTATION KEY No. BECAUSE IT IS REQUIRED TO INSTALL PRODUCT

IMPLEMENTATION KEY No.     NAME OF PRODUCT
----------------------------------------------
1234-567-890               CALC/Win Lite V2.0

ENTER IMPLEMENTATION KEY No. FOR CONFIRMATION
 : 1234-567-890

CONFIRMED

F I G.  1 9

A ──→ REQUESTED PRODUCT IMPLEMENTATION LIST IS AS FOLLOWS

1. NIFTY-ID: AAAAAAA
2. NAME: MINORU KATO
3. POST CODE: 213
4. ADDRESS: A-A-A, SHINSAKU, TAKATSU-KU, KAWASAKI CITY
5. TELEPHONE NUMBER: 044-777-1111
6. CD NUMBER: 1234
7. ACCESS NUMBER: 0946-061-921

| PRODUCT NUMBER | IMPLEMENTATION KEY No. | NAME OF PRODUCT |
|---|---|---|
| 101 | 1234-567-890 | CALC/Win Lite V2.0 |
| 205 | 1234-567-891 | MRDB for Windows V1.1 |

B ──→ IMPLEMENTATION FEE (XXXX YEN) IS ADDED TO NIFTY-SERVE USE FEE AND TRANSFERRED FROM YOUR ACCOUNT

F I G. 21

```
   RECORD NAME       TYPE

1 CD NUMBER:                            CD_NO CHAR(4),
 2 PRODUCT NUMBER:                       WORK_NO CHAR(3),
 3 ABBREVIATION OF PRODUCT:              WORK_ADDREV CHAR(60),        /* "NAME OF PRODUCT" WHEN DISPLAYED */
 4 DESCRIPTION OF PRODUCT FOR INQUIRY:   GOODS_EXPLAN CHAR(80),       /* MESSAGE */
 5 PLANNING SEQUENCE No.:                PLAN_NO NUMBER(3),           /* NO OPERATION REQUIRED */
 6 SALES PRICE NEW:                      NEW_PRICE NUMBER(6),
 7 SALES PRICE OLD:                      OLD_PRICE NUMBER(6),
 8 PRICE SWITCH DATE:                    PRICE_CHG YYYYMMDD NUMBER(8),
 9 ABBREVIATION OF PROVIDER:             PROVIDER CHAR(50),           /* NO OPERATION REQUIRED */
10 URGENT SALES STOP TYPE:               URGENCY_STOP CHAR(1),
11 SALES START DATE:                     START_YYYYMMDD NUMBER(8),
12 SALES START TIME:                     START_HHMMSS NUMBER(6),
13 SALES END DATE:                       STOP_YYYYMMDD NUMBER(8),
14 SALES END TIME:                       STOP_HHMMSS NUMBER(6),
15 RE-SALES TYPE:                        AGAIN_START CHAR(1),
16 RE-SALES START DATE:                  AGAIN_START_YYYYMMDD NUMBER(8),
17 RE-SALES START TIME:                  AGAIN_START_HHMMSS NUMBER(6),
18 RE-SALES END DATE:                    AGAIN_STOP_YYYYMMDD NUMBER(8),
19 RE-SALES END TIME:                    AGAIN_STOP_HHMMSS NUMBER(6),
20 SOFTWARE KEY:                         SOFT_KEY CHAR(8),
21 REGISTRATION DATE:                    REGIST_YYYYMMDD NUMBER(8),
22 UPDATE DATE:                          UPDATE_YYYYMMDD NUMBER(8),
23 UPDATE TIME:                          UPDATE_HHMMSS NUMBER(6),
24 CODE OF UPDATING PERSON:              UPDATE_PCODE CHAR(8),        /* NO OPERATION REQUIRED */
25 SALES TYPE:                           SALE_CLASS CHAR(1),          /* NO OPERATION REQUIRED */
26 SALES FORM TYPE:                      SALE_FORM CHAR(2),
27 SALES STRATEGY TYPE:                  SALE_STRTGY CHAR(1),         /* NO OPERATION REQUIRED */
28 SALES STRATEGY DETAIL TYPE:           SALE_STRTGY_DTL CHAR(1)      /* NO OPERATION REQUIRED */
```

FIG. 22

```
     RECORD NAME     TYPE

1  NIFTY-ID:                 NIFTY_ID CHAR(8),
2  MACHINE ID:               MACHINE_ID NUMBER(10),
3  CD NUMBER:                CD_NO CHAR(4),
4  PRODUCT NUMBER:           WORK_NO CHAR(3),
5  BRANCH NUMBER:            BRANCH_NO NUMBER(3),   /* SPACE FOR DEFAULT. NO OPERATION IS REQUIRED. */
6  DATA:                     DATA_YYYYMMDD NUMBER(8),
7  ABBREVIATION OF PRODUCT:  WORK_ABBREV CHAR(60),
8  PURCHASE AMOUNT:          BUY_MONEY NUMBER(6),
9  NUMBER OF ACCEPTED PURCHASE: BUY_RECEPT_TIMES NUMBER(3), /* INCLUDING PURCHASE OF NO CHARGE */
10 NUMBER OF PURCHASE:       BUY_TIMES NUMBER(3)    /* PURCHASE RECORDED FOR ACCOUNTING */
```

F I G. 2 3

```
RECORD NAME        TYPE

1  NIFTY-ID                          : NIFTY_ID CHAR(8)    UNIQUE.
 2  CREDIT TYPE                       : CR_CARD CHAR(2),
 3  CREDIT NUMBER                     : CR_NO CHAR(19),
 4  NAME                              : USR_RAME CHAR(20),           10 DIGITS
 5  POST CODE                         : ZIP_CODE CHAR(6),             6 DIGITS
 6  ADDRESS                           : USR_ADDRESS CHAR(160),
 7  TELEPHONE NUMBER                  : USR_TEL CHAR(14),            14 DIGITS
 8  MODEL NUMBER 1                    : MACHINE 1 CHAR(16),           8 DIGITS
 9  MODEL NUMBER 2                    : MACHINE 2 CHAR(16),           8 DIGITS
10  MODEL NUMBER 3                    : MACHINE 3 CHAR(16),           8 DIGITS
11  MODEL NUMBER 4                    : MACHINE 4 CHAR(16),           8 DIGITS
12  MODEL NUMBER 5                    : MACHINE 5 CHAR(16),           8 DIGITS
13  BIRTHDAY                          : BIRTH_DAY NUMBER(8),DIGIT
14  AGE                               : AGE-NUMBER(3),               3 DIGITS
15  GENDER                            : SEX NUMBER(1),               1 DIGITS  /* 1:MALE  2:FEMALE */
16  CREDIT FLAG                       : YOSHIN_FLAG CHAR(1),DIGIT              /* 0 FOR DEFALT */
17  CREDIT LIMIT NEW                  : NEW_YOSHIN NUMBER(7),                  /* USE LIMIT AMOUNT FOR *(MONTH): 
                                                                                  500 THOUSAND YEN FOR DEFAULT */
18  CREDIT-LIMIT OLD                  : OLD_YOSHIN NUMBER(7),                  /* USE LIMIT AMOUNT FOR *(MONTH):
                                                                                  500 THOUSAND YEN FOR DEFAULT */
19  CREDIT SWITCH DATE                : YOSHIN_CHG_YYYYMMDD NUMBER(8), /* ACCESS DATE FOR DEFAULT */
20  PURCHASE AMOUNT
    OF PREVIOUS MONTH                 : LAST_MONTH_MONEY NUMBER(8),
21  PURCHASE AMOUNT
    OF CURRENT MONTH                  : MONTH_MONEY NUMBER(8),
22  PURCHASE AMOUNT SWITCH DATE       : BUY_CHG_YYYYMMDD NUMBER(8),   /* NOT USED */
23  UPDATE DATE                       : UPDATE-YYYYMMDD NUMBER(8),  /* SPACE FOR DEFAULT NO OPERATION REQUIRED */
24  UPDATE TIME                       : UPDATE_HHMMSS NUMBER(6),    /* SPACE FOR DEFAULT NO OPERATION REQUIRED */
25  CODE OF UPDATING PERSON           : UPDATE_PCODE CHAR(8)        /* SPACE FOR DEFAULT NO OPERATION REQUIRED */
```

FIG. 24

|    |                       | RECORD NAME   TYPE         |
|----|-----------------------|----------------------------|
| 1  | NIFTY ID :            | NIFTY_ID CHAR(8),          |
| 2  | MACHINE ID :          | MACHINE_ID NUMBER(10),     |
| 3  | CD NUMBER :           | CD_NO CHAR(4),             |
| 4  | PRODUCT NUMBER :      | WORK_NO CHAR(3),           |
| 5  | BRANCH NUMBER :       | BRANCH_NO NUMBER(3),       |
| 6  | DATE :                | DATE_YYYYMMDD NUMBER(8),   |
| 7  | TIME :                | TIME_HHMMSS NUMBER(6),     |
| 8  | PURCHASE AMOUNT       | BUY_MONEY NUMBER(6),       |
| 9  | TYPE OF CREDIT COMPANY| CR_COMPANY CHAR(2),        |
| 10 | CREDIT NUMBER         | CR_NO CHAR(19),            |
| 11 | NAME :                | USR_NAME CHAR(20),         |
| 12 | GENDER :              | SEX CHAR(1),  1 DIGIT      |
| 13 | BIRTHDAY :            | BIRTH_DAY NUMBER(8),       |
| 14 | AGE :                 | AGE NUMBER(3), DIGIT       |
| 15 | MODEL NUMBER 1 :      | MACHINE_NAME 1 CHAR(16),   |
| 16 | MODEL NUMBER 2 :      | MACHINE_NAME 2 CHAR(16),   |
| 17 | MODEL NUMBER 3 :      | MACHINE_NAME 3 CHAR(16),   |
| 18 | MODEL NUMBER 4 :      | MACHINE_NAME 4 CHAR(16),   |
| 19 | MODEL NUMBER 5 :      | MACHINE_NAME 5 CHAR(16),   |
| 20 | POST CODE :           | ZIP_CODE CHAR(6),          |
| 21 | ADDRESS :             | USR_ADDRESS CHAR(160),     |
| 22 | TELEPHONE NUMBER :    | USR_TEL CHAR(14),          |
| 23 | ACCESS NUMBER :       | ACCESS_NO NUMBER(10),      |
| 24 | IMPLEMENTATION KEY No.: | INTRO_KEY_NO NUMBER(10), |

FIG. 25

|    |                      | RECORD NAME TYPE           |
|----|----------------------|----------------------------|
| 1  | NIFTY ID :           | NIFTY_ID CHAR(8),          |
| 2  | MACHINE ID :         | MACHINE_ID NUMBER(10),     |
| 3  | CD NUMBER :          | CD_NO CHAR(4),             |
| 4  | PRODUCT NUMBER :     | WORK_NO CHAR(3),           |
| 5  | BRANCH NUMBER :      | BRANCH_NO NUMBER(3),       |
| 6  | DATE :               | DATE_YYYYMMDD NUMBER(8),   |
| 7  | TIME :               | TIME_HHMMSS NUMBER(6),     |
| 8  | PURCHASE AMOUNT      | BUY_MONEY NUMBER(6),       |
| 9  | TYPE OF CREDIT COMPANY | CR_COMPANY CHAR(2),      |
| 10 | CREDIT NUMBER        | CR_NO CHAR(19),            |
| 11 | NAME :               | USR_NAME CHAR(20),         |
| 12 | GENDER :             | SEX CHAR(1), 1 DIGIT       |
| 13 | BIRTHDAY :           | BIRTH_DAY NUMBER(8),       |
| 14 | AGE :                | AGE NUMBER(3), DIGIT       |
| 15 | MODEL NUMBER 1 :     | MACHINE_NAME 1 CHAR(16),   |
| 16 | MODEL NUMBER 2 :     | MACHINE_NAME 2 CHAR(16),   |
| 17 | MODEL NUMBER 3 :     | MACHINE_NAME 3 CHAR(16),   |
| 18 | MODEL NUMBER 4 :     | MACHINE_NAME 4 CHAR(16),   |
| 19 | MODEL NUMBER 5 :     | MACHINE_NAME 5 CHAR(16),   |
| 20 | POST CODE :          | ZIP_CODE CHAR(6),          |
| 21 | ADDRESS :            | USR_ADDRESS CHAR(160),     |
| 22 | TELEPHONE NUMBER :   | USR_TEL CHAR(14),          |
| 23 | ACCESS NUMBER :      | ACCESS_NO NUMBER(10),      |
| 24 | IMPLEMENTATION KEY No.: | INTRO_KEY_NO NUMBER(10), |
| 25 | REASON FOR ERROR :   | ERROR_REASON_NUMBER(10),   |

```
RECORD NAME   TYPE

DATE_YYYYMMDD  NUMBER(8),
TIME_HHMMSS    NUMBER(6),
NIFTY_ID       CHAR(8),
SESSION_CLASS  CHAR(1),
SERVICE_ID     NUMBER(3),/* NO OPERATION REQUIRED */
```

1  DATE :
2  TIME :
3  NIFTY-ID :
4  LOG IN/LOG OUT :
5  SERVICE ID :

SYSTEM AND METHOD OF ONLINE DECIPHERING DATA ON STORAGE MEDIUM

BACKGROUND OF THE INVENTION

1. Field of the Invention

The present invention relates to a system and method of online releasing of software, which is encrypted and stored on a storage medium and distributed to the user, from a cryptogram.

2. Description of the Related Art

Recently, it has become popular that CD-ROM disks (compact disk read only memory) as large capacity storage media are distributed with software, such as programs, image data, etc. stored on them. The users obtain the CD-ROM disks directly at stores or through mail order systems. However, the user has to either go all the way to the store or wait for a certain period to actually obtain the disks.

Under the above described situation, it has been suggested that the CD-ROMs should be first distributed to the users. The problem is how the distribution is established.

SUMMARY OF THE INVENTION

The present invention aims at providing a system and method of online releasing of software distributed to a user from a cryptogram, so that the information stored on a storage medium such as a CD-ROM, etc. distributed to the users, can be purchased and utilized by them.

The online deciphering system according to the present invention comprises a communication unit, an interactive unit, an information storage unit, and a key generating unit. The online deciphering system corresponds to, for example, a host computing system connected to a user terminal through a communications network to decipher data from an encrypted form on a storage medium mounted in the user terminal unit. The storage medium can be, for example, a CD-ROM, floppy disk, memory card, magnetic disk, optical disk, magneto-optical disk, etc.

According to an aspect of the present invention, the communication unit transmits and receives information to and from a user terminal unit through the communications network. The interactive unit releases online the data encrypted on the user storage medium from a cryptogram through the communication unit according to the order information received in an interactive form from the above described user terminal unit.

Thus, the user can decipher and then utilize the contents of a specified software on the distributed storage medium.

According to another aspect of the present invention, the interactive unit transmits online through the communication unit a first key information for use in accessing in the user terminal unit the information stored on a user storage medium based on the above described order information.

The interactive unit communicates with the user terminal unit through the communication unit and receives software purchase order information requested by the user. Based on the order information, the interactive unit transmits online to the user terminal unit the first key information for use in accessing the software (information) stored on the storage medium.

Then, the user deciphers the requested software on the user terminal unit using the transmitted first key information, and installs it on a hard disk, etc. The host computer system stores the user identification information and the identification information about the requested software, and charges the user the fee.

According to a further aspect of the present invention, the information storage unit stores a second key information specific to the information stored on the above described storage medium. The interactive unit searches the information storage unit according to the order information, retrieves the second key information corresponding to the ordered information, and transmits to the user terminal unit the first key information generated according to the second key information.

The second key information stored by the information storage unit is a software key specific to the software stored on the storage medium, and is independent of the identification information about the accessing user and user terminal unit. The interactive unit retrieves the corresponding second key information from the information storage unit according to the software identification information contained in the order information.

Using the software-specific second key information, the first key information effective only to a specified software is generated. Therefore, it is impossible to use the first key information for deciphering other software. As a result, the deciphering service charge can be collected for each piece of software.

According to a further aspect of the present invention, the key generating unit generates the first key information according to the user identification information or user terminal unit identification information contained in the order information, and according to the second key information received from the interactive unit.

Thus, the generated first key information is a composite key required to read, on the user terminal unit from which the order information is transmitted, the software having the second key information as a software key.

For example, deciphering data according to the first key information generated using the user identification information and second key information allows the user to be automatically charged corresponding to the user identification information. Therefore, an error occurs if a person other than the authorized user tries to decipher the data. The first key information generated using the user terminal unit identification information and second key information can be used only on the corresponding user terminal unit. Therefore, the software cannot be read on another user terminal unit using the first key information.

According to a further aspect of the present invention, the user terminal unit comprises a mounting unit, an order output unit, and a deciphering unit. The mounting unit mounts a storage medium. The order output unit accesses an deciphering center through a communications network, selects the information stored on the above described storage medium in an interactive mode with the deciphering unit, and outputs order information to the deciphering center.

The deciphering unit receives online from the deciphering center through the communications network the first key information for use in accessing the selected information from the storage medium, and then accesses the selected information on the storage medium according to the first key information.

According to a further aspect of the present invention, a user terminal unit comprises a computer-readable storage medium for storing a program for a deciphering service.

The computer-readable storage medium directs the computer at the user terminal unit to access the deciphering center through the communications network, select the information stored on the above described storage medium in an interactive mode with the deciphering unit, and output order information to the deciphering center. It also directs the computer to receive online from the deciphering center through the communications network the first key information for use in accessing the selected information on the storage medium, and then access the selected information on the storage medium according to the first key information.

The computer-readable storage medium can be either the same one as the storage medium storing the information to be accessed, or another one.

BRIEF DESCRIPTION OF THE DRAWINGS

FIG. 1 shows the principle of the online deciphering system according to the present invention;

FIG. 7 shows the display screen (1) of a common communications software;

FIG. 8 shows the display screen (2) of a common communications software;

FIG. 9 shows the display screen (3) of a common communications software;

FIG. 10 shows the display screen (4) of a common communications software;

FIG. 11 shows the display screen (5) of a common communications software;

FIG. 12 shows the display screen (1) where data is manually input;

FIG. 13 shows the display screen (2) where data is manually input;

FIG. 14 shows the display screen (3) where data is manually input;

FIG. 15 shows the display screen where previously-known information is omitted;

FIG. 16 shows a transmitted mail and received mail;

FIG. 18 shows the display screen when the software has already been updated;

FIG. 19 shows the display screen for confirmation of a key number;

FIG. 21 shows the display screen showing the contents of the communications log;

FIG. 22 shows a record of the active contents table;

FIG. 23 shows a record of the purchase history table;

FIG. 24 shows a record of the active customer table;

FIG. 25 shows a record of the accounting log table;

FIG. 26 shows a record of the error log table; and

FIG. 27 shows a record of the access log table.

DESCRIPTION OF THE PREFERRED EMBODIMENTS

The embodiments of the present invention are described in detail below by referring to the attached drawings.

FIG. 1 shows the principle of the online deciphering system according to the present invention. The online deciphering system shown in FIG. 1 comprises a communication unit 1, an interactive unit 2, a key generating unit 3, and an information storage unit 4.

The communication unit 1 transmits and receives information to and from a user terminal unit through the communications network. The interactive unit 2 releases online the data encrypted on the user encrypted storage medium through the communication unit 1 according to the order information received in an interactive form from the above described user terminal unit. An encrypted storage medium refers to a medium such as a CD-ROM disk, etc. containing encrypted information.

The interactive unit 2 online transmits through the communication unit 1 a first key information for use in accessing in the user terminal unit the information stored on a user encrypted storage medium based on the above described order information.

The information storage unit 4 stores the second key information specific to the information stored on the above described storage medium. The interactive unit 2 searches the information storage unit 4 according to the order information, and retrieves the second key information corresponding to ordered information.

The key generating unit 3 generates the first key information according to the user identification information or user terminal unit identification information contained in the order information, and according to the second key information.

Figure 3A:
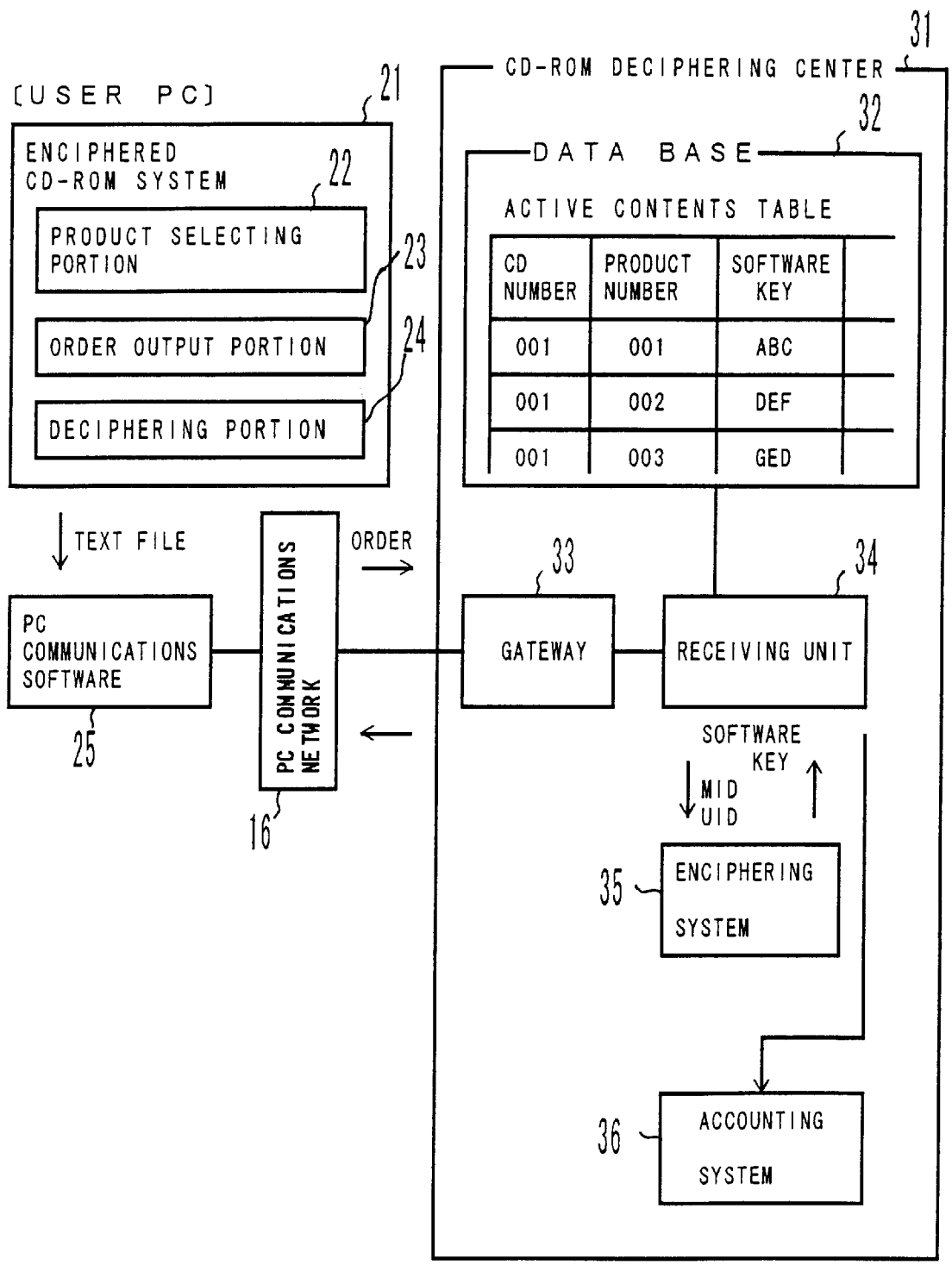
FIG. 3A shows the configuration of the system according to the embodiment of the present invention.

For example, the communication unit 1 shown in FIG. 1 corresponds to a gateway 33 shown in FIG. 3A, the interactive unit 2 corresponds to a receiving unit 34, the key generating unit 3 corresponds to an enciphering system 35, and the information storage unit 4 corresponds to a database 32. The storage medium corresponds to the enciphered CD-ROM, and the user terminal corresponds to the personal computer (PC) comprising an enciphered CD-ROM system 21.

The online deciphering system shown in FIG. 1 corresponds to, for example, a host computing system connected to the user terminal unit through the communications network, and provides a deciphering service for the storage medium such as a CD-ROM disk, etc. mounted in the user terminal unit, at a request from the user.

The interactive unit 2 communicates with the user terminal unit through the communication unit 1 and receives software purchase order information requested by the user. Based on the order information, the interactive unit transmits online to the user terminal unit the first key information for use in retrieving the software (information) stored on the encrypted storage medium.

Then, the user deciphers the requested software on the user terminal unit using the transmitted first key information, and installs it to a hard disk, etc. The host computer system stores the user identification information and the identification information about the requested software, and charges the user the fee.

The second key information stored by the information storage unit 4 is a software key specific to the software stored on the encrypted storage medium, and is independent of the identification information about the accessing user and user terminal unit. The interactive unit retrieves the corresponding second key information from the information storage unit 4 according to the software identification information contained in the order information, and transmits it to the key generating unit 3.

The key generating unit 3 generates the first key information to be provided to the user, according to the second key information received from the interactive unit 2 and according to the user identification information or user terminal unit identification information contained in the order information. Thus, the generated first key information is composite key information required to read, on the user terminal unit through which the order information is transmitted, the software having the second key information as a software key.

For example, deciphering data according to the first key information generated using the user identification information and second key information allows the user to be automatically charged corresponding to the user identification information. Therefore, an error occurs if a person other than the authorized user tries to decipher the data. The first key information generated using the user terminal unit identification information and second key information can be used only on the corresponding user terminal unit. Therefore, the software cannot be read on another user terminal unit using the first key information.

Thus, the user has the software on the distributed storage medium released online from a cryptogram, at his or her request.

Figure 2:
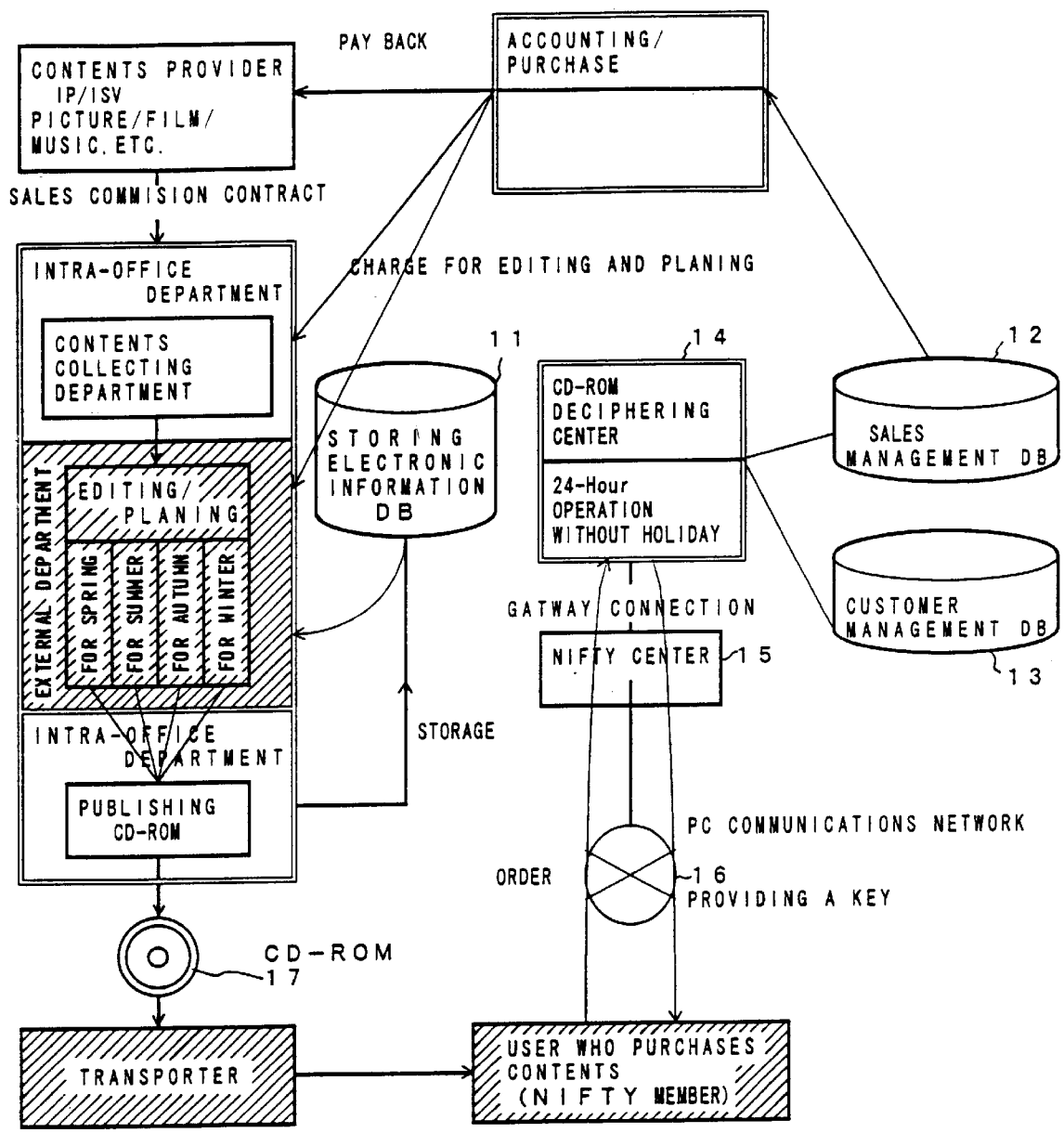
FIG. 2 shows a distribution system for the CD-ROM software.

FIG. 2 shows the distribution system of the software stored on CD-ROM (CD-ROM software). A sales agent dealing in CD-ROM software establishes a CD-ROM deciphering center 14, and the information is managed in databases 11, 12, and 13. A contents provider contracts with the sales agent to perform the sales, and provides pictures, films, music, etc. for the sales agent as the contents of the CD-ROMs. The contents collecting department of the sales agent stores the received contents in the database 11 to be used as a warehouse for the electronic information. The sales agent retrieves the contents from the database 11 based on the editing plan scheduled by the planning department of an external agent, and generates a CD-ROM 17.

The published CD-ROM 17 is distributed by a distributor to users who are NIFTY members. NIFTY or NIFTY-SERVE is the name of a personal computer communications service. The user checks the product list on the CD-ROM 17 mounted into his or her personal computer, and is then connected to the CD-ROM deciphering center 14 using a gateway through a personal computer communications network 16 and a NIFTY center 15. Thus, the user orders one of the products, that is, a CD-ROM software. The CD-ROM deciphering center 14 provides the user with the key to the ordered product online, and stores the sales record in the databases 12 and 13. The databases 12 and 13 are used as a sales management DB (database) and a customer management DB respectively. In this example, the CD-ROM deciphering center 14 is open all hours.

The accounting/purchasing department of the sales agent refers to the sales information stored in the database 12 to distribute the amount of the sales and perform an accounting process. At this time, the contents provider gets payment based on the contract, and the contents collecting department and the planning department record the editing and planning fees.

FIG. 3A shows the configuration of the system for realizing the distribution system as shown in FIG. 2. In FIG. 3A, the user personal computer (user PC) is provided with the enciphered CD-ROM system 21 comprising a product selecting portion 22, an order output portion 23, and a deciphering portion 24. When the enciphered CD-ROM system 21 is installed by the user from the CD-ROM 17 to the user PC, a machine identifier (MID) specifying the user PC is generated, provided with an illegal copy preventing mechanism, and recorded in a file. The enciphered CD-ROM system 21 is connected to a CD-ROM deciphering center 31 through a common communications terminal software 25 (PC communications software) and the common PC communications network 16.

The CD-ROM deciphering center 31 comprises the database 32, gateway 33, receiving unit 34, enciphering system 35, and an accounting system 36. The receiving unit 34, enciphering system 35, and accounting system 36 corresponds to the functions of the processor of the host computer forming the CD-ROM deciphering center 31. The database 32 stores various management tables such as an active contents table, purchase history table, active customer table, accounting log table, error log table, access log table, etc.

The user mounts the enciphered CD-ROM 17, selects a product through the product selecting unit 22, and generates a text file as an order file using the order output unit 23. Then, using the communications terminal software 25, the user is connected to the PC communications network 16, accesses the CD-ROM deciphering center 31 through the gateway 33, and orders the product by presenting the order file. At this time, the user enciphers the user identifier (UID) and MID together with the CD number and product number, and notifies the CD-ROM deciphering center 31 of the enciphered data. These numbers and enciphered UID and MID are recorded in the order file by the enciphered CD-ROM system 21.

The CD-ROM deciphering center 31 retrieves the CD number and product number from the active contents table according to the order file received by the receiving unit 34, and reads the corresponding software key. Then, it passes to the enciphering system 35 the read software key and the UID and MID entered in the order file. The enciphering system 35 enciphers the software key using one or both of UID and MID, and generates the key number of the ordered product. The receiving unit 34 notifies the user of the key number generated by the enciphering system 35. The accounting system 36 computes data relating to the charge for the product in association with the receiving unit 34.

On the other hand, the user stores the key notified by the CD-ROM deciphering center 31, and deciphers the product data on the CD-ROM 17. At this time, the deciphering unit 24 decodes the user-input key number using the user UID and user PC MID, decodes the product data after obtaining the software key of the ordered product, and finally implements the product and utilizes it.

Thus, enciphering the software key using the MID of the user PC limits the key to use only on the user PC corresponding to the MID. This prevents illegal use of the software key on other personal computers. Furthermore, enciphering the software key using the UID allows the user to be automatically charged the product fee according to the UID. If each user is preliminarily informed of this, illegal use by other users can be successfully avoided. Additionally, if data is enciphered using both MID and UID, a double preventive effect is obtained.

Figure 3B:
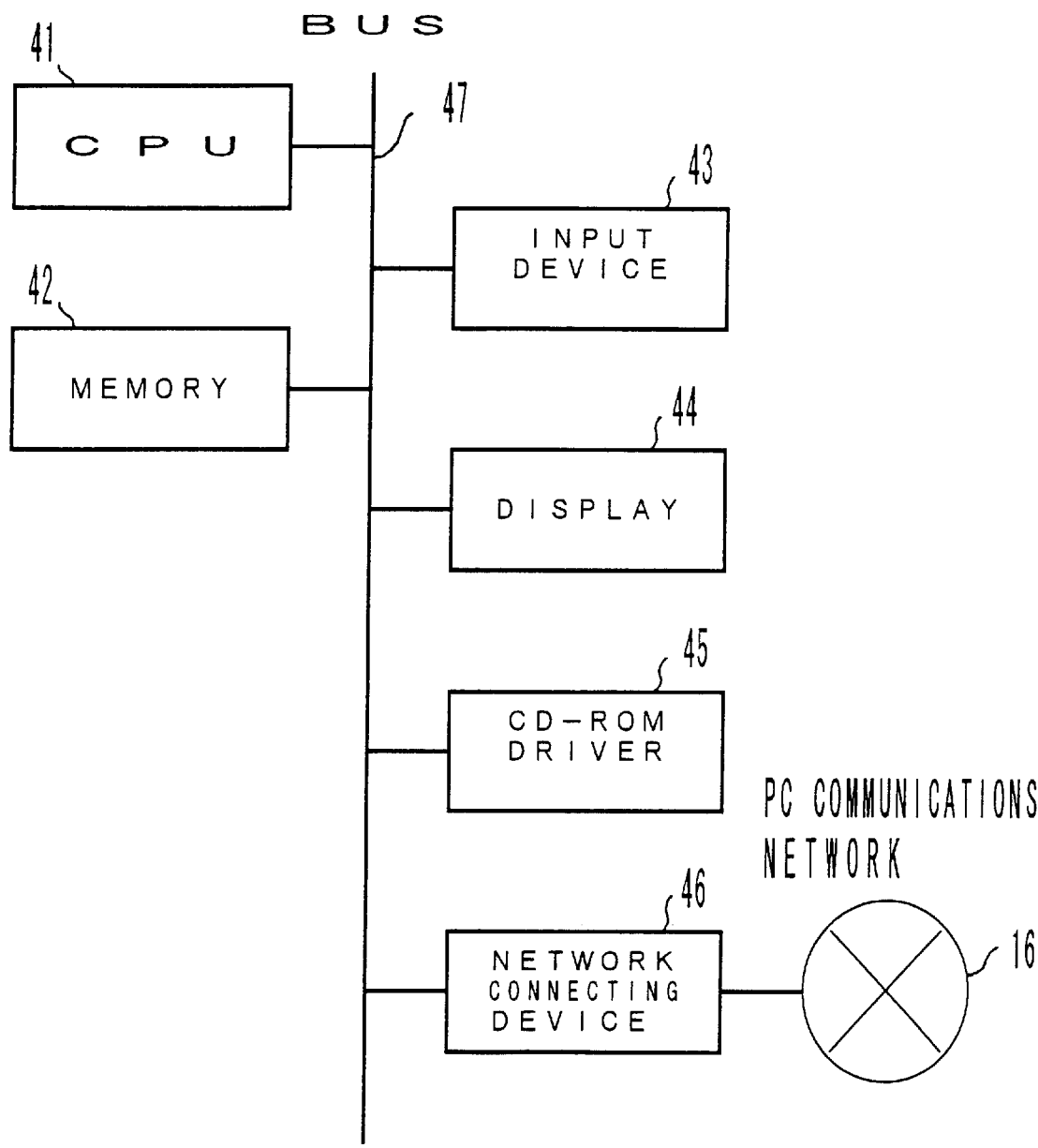
FIG. 3B shows the configuration of the information processing device.

FIG. 3B shows the configuration of the computer used as a PC. The computer shown in FIG. 3B comprises a CPU 41, a memory 42, an input device 43, a display 44, a CD-ROM driver 45, and a network connecting device 46. Each of these devices are connected via a bus 47.

The CD-ROM 17 is loaded into the CD-ROM driver 45, and the program corresponding to the enciphered CD-ROM system 21 is installed from the CD-ROM 17 to the memory 42. The CPU 41 executes the program using the memory 42 and performs the processes of the product selecting portion 22, order output portion 23, and deciphering portion 24.

The input device 43 corresponds to, for example, a keyboard, a pointing device, etc. and is used in inputting instructions from the user. The screen of the display 44 displays messages, etc. The network connecting device 46 is connected to the PC communications network 16 to control the communications to the CD-ROM deciphering center 31.

The configuration of the host computer of the CD-ROM deciphering center 31 is basically the same as that shown in FIG. 3B. However, the CPU of the host computer does not perform the process of the enciphered CD-ROM system 21, but the processes of the receiving unit 34, enciphering system 35, accounting system 36, etc.

Figure 4:
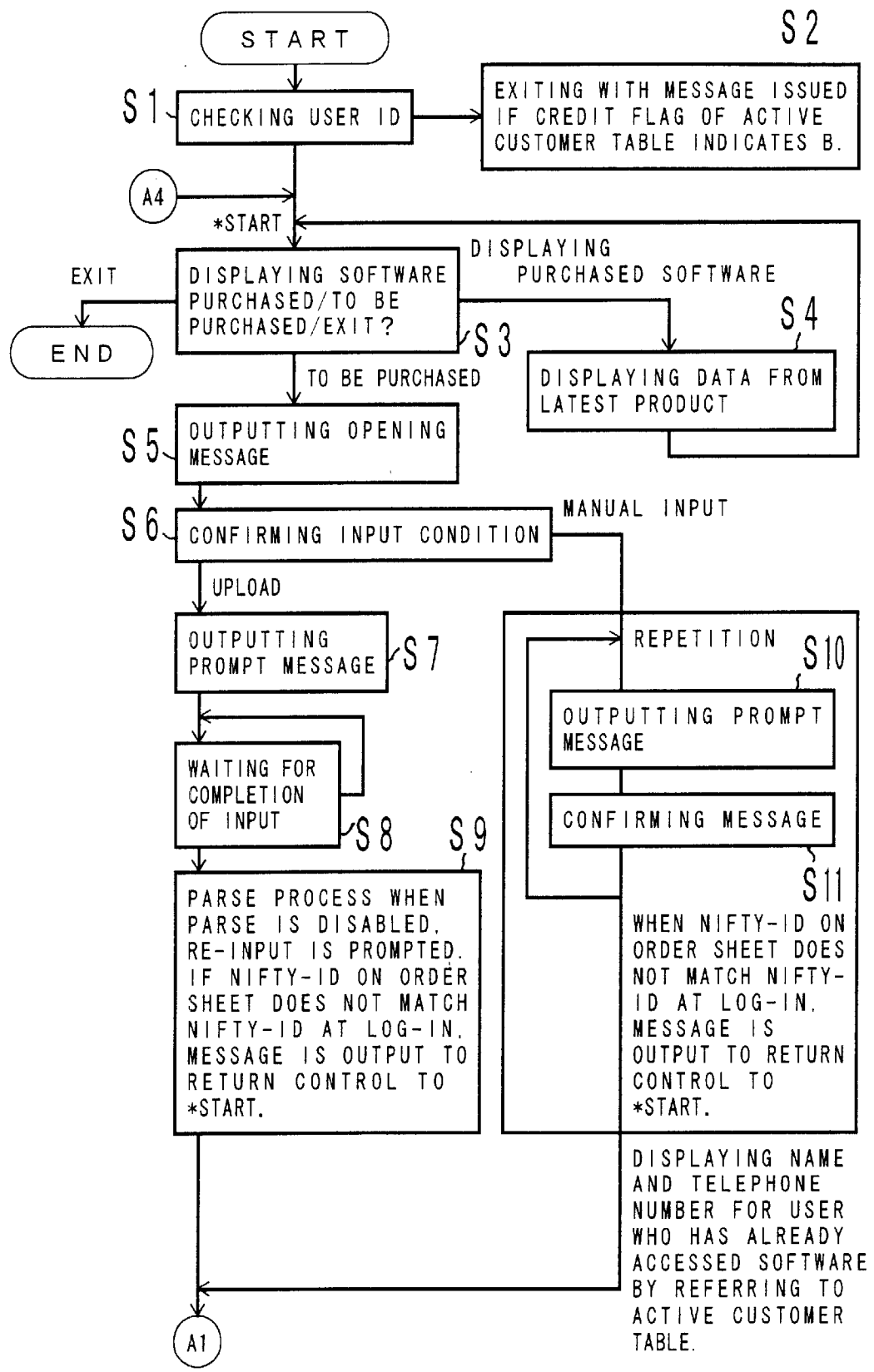
FIG. 4 is a flowchart (1) showing the CD-ROM deciphering process.
Figure 5:
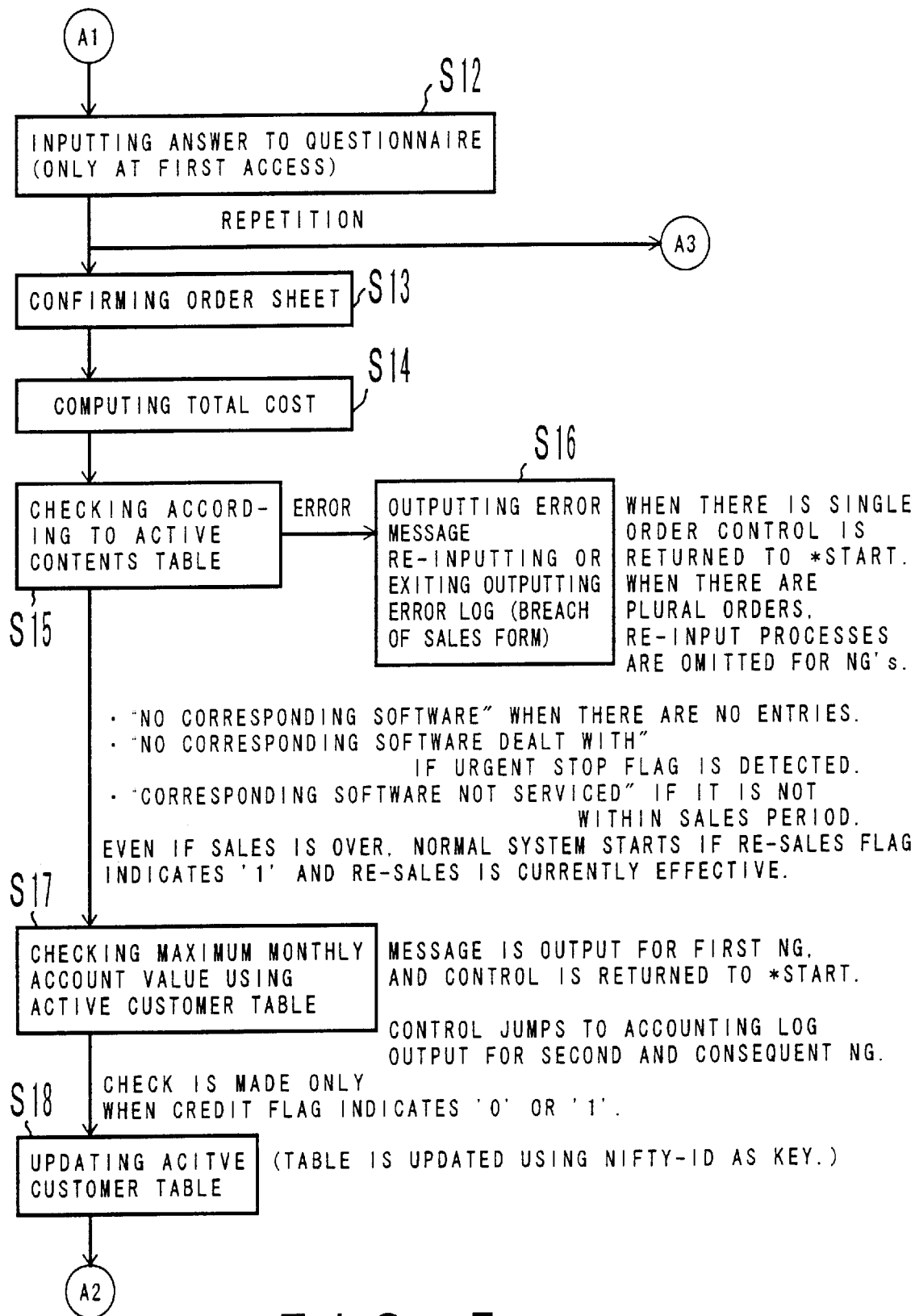
FIG. 5 is a flowchart (2) showing the CD-ROM deciphering process.
Figure 6:
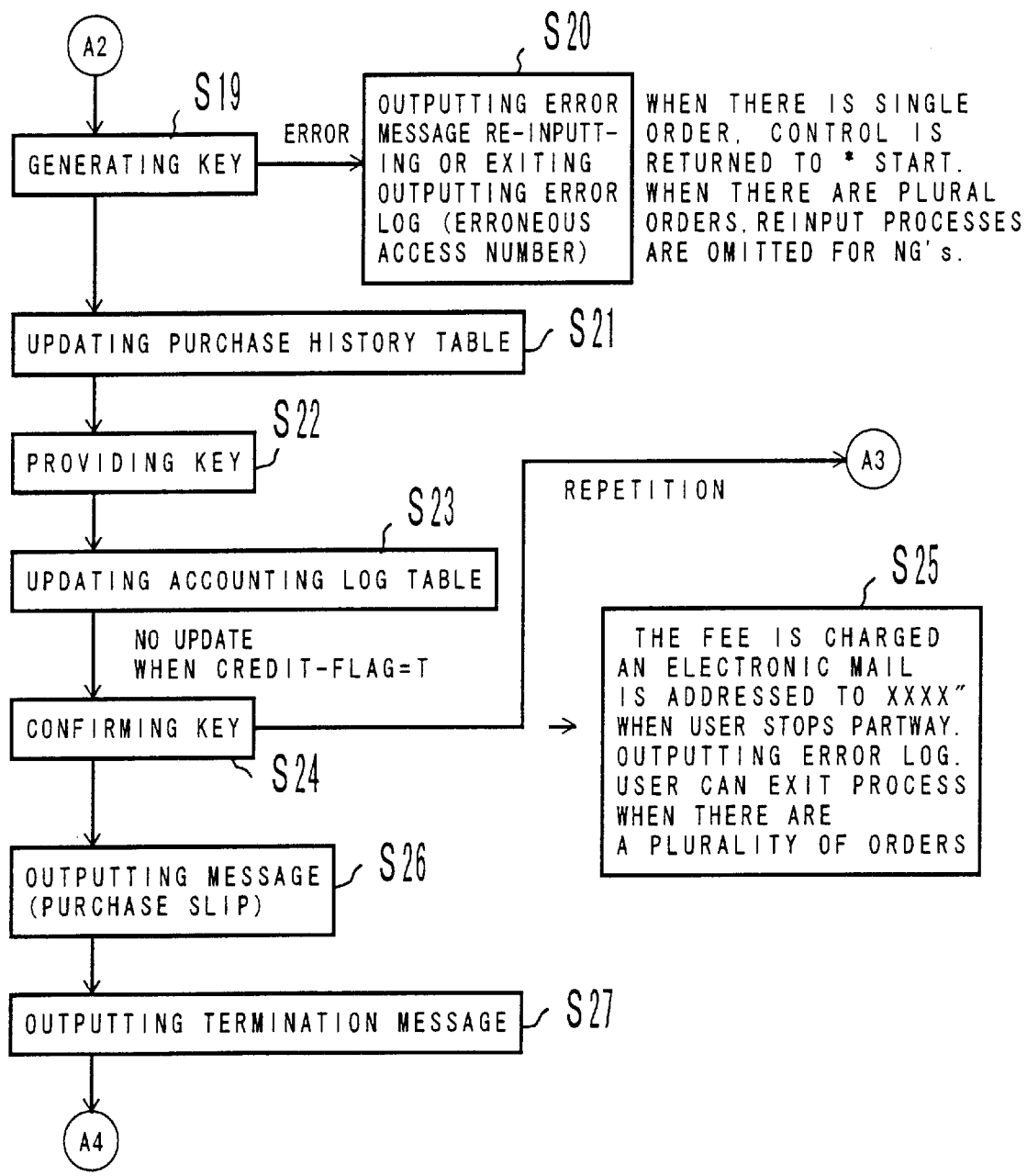
FIG. 6 is a flowchart (3) showing the CD-ROM deciphering process.

FIGS. 4, 5, and 6 are flowcharts showing the CD-ROM deciphering process performed by the CD-ROM deciphering center 31. FIGS. 7, 8, 9, 10, and 11 show the screen images of the user PC displayed when the common PC communications software 25 is used. In this example, HIDE-TERM is used as well-known example of the PC communications software 25.

If the process starts as shown in FIG. 4, the receiving unit 34 first checks the user ID (UID) (step S1). If the credit flag of the active customer table corresponding to the user ID is B indicating that the user is entered on the "black-list", the user is made to exit the program with a termination message (step S2). Otherwise, the user is inquired as to whether he or she requests to purchase software, display an already purchased software, or exit the program (step S3).

In this example, the screen as shown in FIG. 7 is displayed on the display 44. In FIG. 7, the user selects from the menu "Media Shuttle" corresponding to the CD-ROM software sales service. After the "Media Shuttle" start message, three selection items, that is, obtaining the implementation key number, displaying a product list, and exiting the program, are displayed.

When the user selects to exit, the process terminates. When the user selects to display the already purchased software, the software already purchased by the user is displayed in 10 rows from the latest data (step S4). Unless the user stops partway, the data is completely displayed. When the user selects to purchase, an opening message is output (step S5), and the order file input condition is confirmed (step S6).

When the user selects the upload as an input method, a prompt message is output (step S7) and the system waits for the input to terminate (step S8). When the input terminates, an input order file is interpreted through a parse process (step S9). When it cannot be parsed, the prompt message is issued again. If the NIFTY-ID of the order file (order sheet) is different from the log-in NIFTY-ID, then a message is issued to return to *START (step S3). In this example, the log-in NIFTY-ID refers to an identifier received by the user when the user logs into the NIFTY center 15.

When the user selects manual input as an input method, a prompt message is output (step S10). When the user confirms the message (step S11), the next prompt message is output. These processes are repeated until all necessary items are completely input. If the NIFTY-ID of the order sheet is different from the log-in NIFTY-ID, then a message is issued to return to *START.

If the user has accessed the system before, known data such as name, telephone number, etc. can be displayed according to the active customer table, to omit inputting the known data again.

The upload of the text is selected in FIG. 7, and the implementation file as shown in FIG. 8 is uploaded as an order file in the text mode. In FIG. 8, NIFTY-ID corresponds to UID. The CD number indicates the identification number of the CD-ROM. The access number indicates the enciphered result (enciphered MID) of the MID of the user PC. The product numbers 1 and 2 indicate the numbers of the ordered products. The order file is displayed, and then the user selects to amend the order file. As a result, the name is partially amended.

Then, the receiving unit 34 instructs the user to input the answers to the questionnaire (step S12 shown in FIG. 5). However, the user only has to input the answers to the questionnaire at his or her initial access. The contents of the order sheet are checked (step S13).

FIG. 9 shows an example of input answers to the questionnaire. In FIG. 9, the birthday, gender, model of personal computer, and type of credit card are input as the answers to the questionnaire. The number of the first product of the two ordered products is confirmed.

Next, the receiving unit 34 computes the total cost of the ordered products (step S14) and checks the order sheet according to the active contents table (step S15). As a result, if an illegal sales condition breaching a predetermined sales form is detected, it is output as an error with an error message, and the user is prompted to select either to re-input or exit (step S16). Then, an error log is output to the error log table. If data is to be input again, control is returned to *START when there is a single order and the re-input process is omitted for the NG's when there are a plurality of orders.

For example, when an ordered product is not entered in the active contents table, the error message informs, "The specified software does not exist." If an urgent stop flag is set, then the error message informs, "We currently don't deal with this software." If the ordered products are not within the range between the sales start and termination dates, then the error message informs, "The software is out of the sales period." Even if the software does not exist, the system is returned to a normal condition as long as the re-sales flag is 1 and it is within the re-sales period.

If the credit flag indicates 0 or 1, the receiving unit 34 refers to the active customer table to check the maximum account value (MAX) (step S17). When the first NG is encountered, the message is issued to return control to *START. When the second and consequent NGs are encountered, the control jumps to an account log output process.

Then, the active customer table is updated (step S18). In this example, the active customer table is updated using the NIFTY-ID as a key.

According to the instruction from the receiving unit 34, the enciphering system 35 generates a key to be provided to the user (step S19 shown in FIG. 6). If the key cannot be generated due to an incorrect access number, etc., an error message is output to prompt the user to select either re-input or exit (step S20). Then, an error log is output to the error log table. If data is re-input, control is returned to *START when there is a single order, and the re-input process is omitted for the NGs when there are a plurality of orders.

Next, the receiving unit 34 updates the purchase history table (step S21), notifies the user of the generated key (step S22), and updates an account log table (step S23). However, if the credit flag=T, the account log table is not updated.

Then, the notified key is checked by the user (step S24), and the processes in and after step S13 are repeated for the product described on the order sheet. If the user stops the purchase for some reason, an error message informing that "The fee is charged. An electronic mail is addressed to XXXX (NIFTY-ID of the system manager)." is output, and an error log is output to the error log table (step S25). If there are a plurality of orders, the user can exit the process here.

The user is informed of the implementation key number shown in FIG. 10 as a key to the product numbered as shown in FIG. 9. As shown in FIG. 10, the user inputs the implementation key number, which is provided for confirmation, through the deciphering unit 24, and the receiving unit 34 of the CD-ROM deciphering center 31 confirms it. Then, the second product number is confirmed, and the corresponding implementation key number is provided.

If the key has been notified and confirmed for all products entered on the order sheet, then a message (purchase slip) is output (step S26), a termination message is output (step S27), and control is returned to *START. When the user selects EXIT in step S3, the process terminates.

FIG. 11 shows an example of displaying the purchase slip and termination message. In FIG. 11, it is clearly indicated that the key charge (implementation charge) is added to the use charge of NIFTY-SERVE.

If the user has not selected the upload of a product order sheet, but has selected the manual input in step S6, then the display screen of the user PC is as shown in FIGS. 12, 13, and 14. In FIGS. 12 and 13, the NIFTY-ID, user name, CD number, access number, birthday, gender, model of the user PC, type of the credit card, and ordered product number are sequentially input in the interactive mode. According to the input CD number, product number, and access number, the implementation key number is notified as shown in FIG. 14.

At this time, if the user has accessed the system before, he or she can omit inputting the already input data as shown in FIG. 15. In FIG. 15, only the NIFTY-ID, that is, the PC communications ID, is input. The other items, that is, the name, address, CD number, and access number have all been entered previously, and are displayed without being re-input. When the user inputs and confirms the product number, the implementation key number is notified similarly as in FIG. 14.

The system shown in FIG. 3 processes an order through common PC communications, but can also process it through an electronic mail system. In this case, the order transmission mail and implementation key number notification mail are shown in, for example, FIG. 16. According to this method, it is not necessary to trace the tree structure of the menu of the PC communications center (NIFTY center) to access the CD-ROM deciphering center 31, thereby efficiently transmitting the key. In the system shown in FIG. 3, the information is stored for each software in the access contents table. Therefore, an individual message is output for each set of software when the product number is confirmed.

Figure 17:
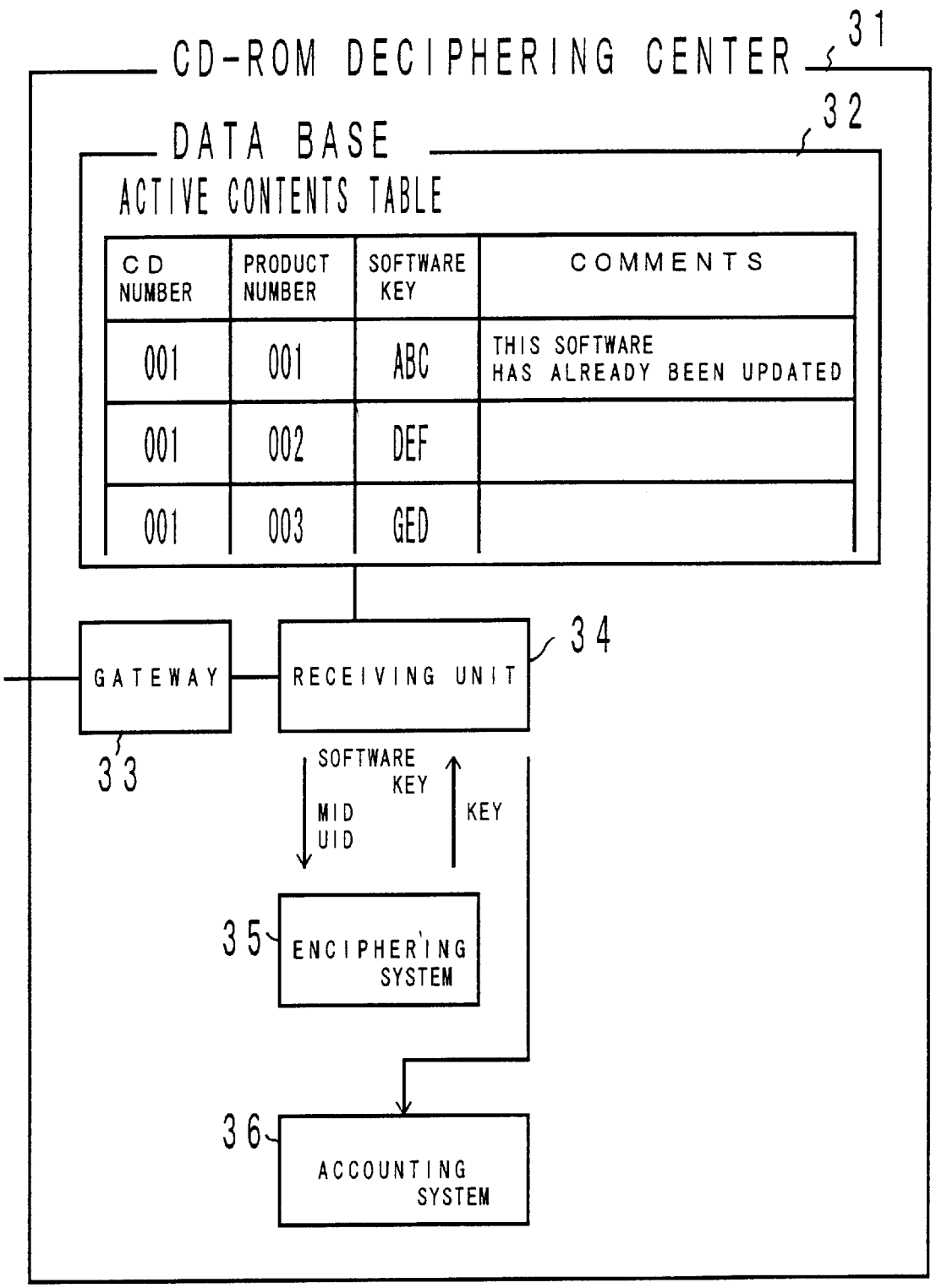
FIG. 17 shows information about each software.

FIG. 17 shows the comment column in the active contents table in the database 32, which stores information about each set of software. In the enciphered CD-ROM 17, there is a time lag between editing the CD-ROM and distributing it. Accordingly, the software may be updated during this period. In such a case, the comment column should contain the information that "this software has been updated" as shown in FIG. 17 so that a corresponding message can be output when the software is ordered. For example, when the product number 001 shown in FIG. 17 is ordered, the message shown in FIG. 18 is output. If the user accepts the message, he or she is to purchase the implementation key number corresponding to the older version of the distributed software. FIG. 18 shows that the user has stopped the purchase.

The information displayed before the notification of the implementation key number can also be "There are bugs in the software. If you accept this, please purchase the software.", "This is the second time you have purchased this software. If you accept this, please purchase the software.", etc.

According to the present embodiment, the notified key number is confirmed in step S24 shown in FIG. 6 so that the user may not mistakenly memorize and use the key number. FIG. 19 shows again the entry screen for confirmation of the key. For example, if the user mistakenly memorizes the implementation key number, then the receiving unit 34 can detect the error because the implementation key number does not match the notified number.

In the above described embodiment, the user memorizes the key notified from the CD-ROM deciphering center 31, and inputs it to the enciphered CD-ROM system 21 through the keyboard to allow the deciphering portion 24 to decipher the CD-ROM. However, the key number should also be noted in a notebook using this method. Instead, if the user records in an electronic file the key notified from the CD-ROM deciphering center 31, the deciphering portion 24 can automatically read the file to decipher the product.

Figure 20:
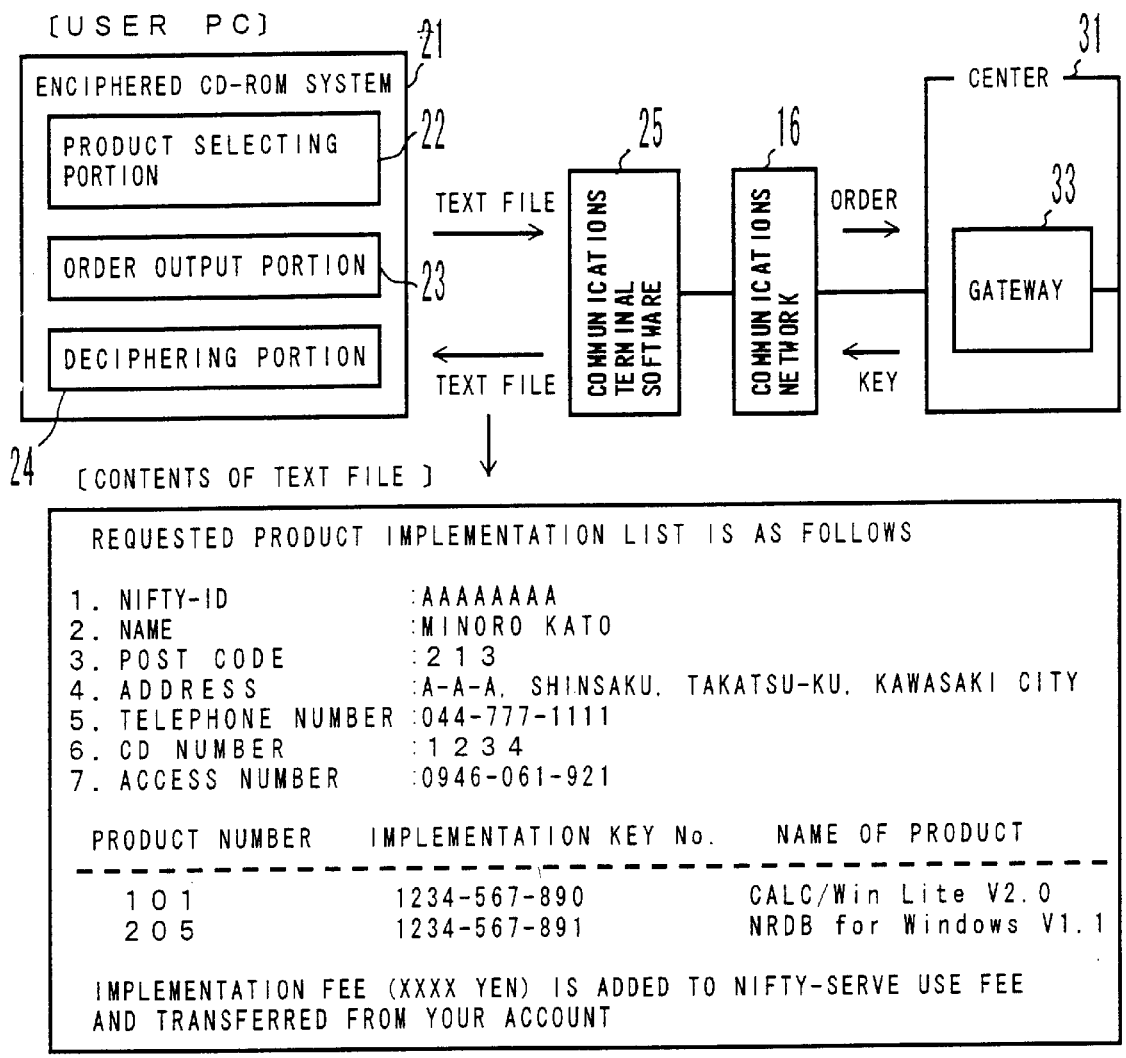
FIG. 20 shows the case in which the key number is recorded in the file.

FIG. 20 shows an example of the text file storing the information notified from the CD-ROM deciphering center 31. The user generates the text file as shown in FIG. 20 using a capability of the PC communications software 25 to write a part of the communications log to the file. The deciphering portion 24 automatically reads the implementation key number described in the text file, and deciphers the CD-ROM.

Instead of the user noting in the file the key number notified from the CD-ROM deciphering center 31, the PC communications software 25 can automatically store the contents of the communications log in the file. In this case, the automatic piloting function of the common PC communications software 25 prepares in the enciphered CD-ROM system 21 the automatic piloting script storing, in the file, from A to B as shown in FIG. 21. The positions of A and B in the communications log are automatically specified by retrieving the character strings "requested product" and "implementation fee" respectively. The deciphering portion 24 reads the implementation key number from the thus-generated file to decipher the CD-ROM.

According to this method, the enciphered CD-ROM system 21 automatically receives the key and deciphers the CD-ROM, thereby reducing the load of the user.

Described below is the record of each table stored in the database 32, shown in FIG. 3A.

FIG. 22 shows the record of the active contents table. The table name is TB ACTIVE CONTENT, and the table is used to obtain the software key according to the user-specified CD number and contents number (product number or work number). It is also used to obtain the sales form and price according to the user-specified contents number.

The table is distributed using a 1.4 MB floppy disk (CSV format/SJIS). The contents number is obtained by merging TYPE and LEVEL. The file name is CD9508.CSV and is used to update the existing table. The name is uniquely assigned using a concatenation key by adding the CD number and contents number.

In FIG. 22, the receiving unit 34 determines the sales price in consideration of the price switch date. The price is updated at 00:00 on the day specified by the price switch date. If the price switch date is set to 0, the old price is assigned.

The contents of the sales form type are as follows.

1: The identical user is provided with the software free of charge for the second and consequent accesses, regardless of the machine ID (MID).

That is, the user is charged for the software when he or she first obtains it, and the software is provided to the user free of charge for the second and consequent accesses.

2: The identical user is provided with the software free of charge for the first through the fifth accesses regardless of the machine ID, but is inhibited from accessing the software for the sixth and consequent accesses.

That is, the software is provided free of charge for the first through fifth accesses, but is inhibited from being accessed for the sixth and consequent accesses.

3: The identical user is provided with the software free of charge for the second and consequent accesses using the same machine ID (MID).

That is, the user is charged for the software when he or she first obtains it, and the software is provided to the user free of charge for the second and consequent accesses.

4: The identical user is provided with the software free of charge for the first through the fifth accesses using the same machine ID, but is inhibited from accessing the software for the sixth and consequent accesses.

That is, the software is provided free of charge for the first through fifth accesses, but is inhibited from being accessed for the sixth and consequent accesses.

5: The software is provided free of charge to the same machine ID for the second and consequent accesses regardless of the user ID.

That is, the machine is charged for the software when it is first provided with the software, and the software is provided to the machine free of charge for the second and consequent accesses.

6: The software is provided free of charge to the same machine ID for the first through fifth accesses regardless of the user ID. However, the machine is prohibited from accessing the software for the sixth and consequent accesses.

That is, the machine is provided with the software free of charge for the first through fifth accesses. However, the machine is prohibited from accessing the software for the sixth and consequent accesses.

7: The user is charged for the software for the second and consequent accesses.

That is, the user is charged for the software regardless of the user ID and machine ID. The user is charged for the software for the first and second accesses.

8: The user is prohibited from accessing the software for the second and consequent accesses.

That is, the user is charged for the software for the first access. If the software has been implemented using the user ID, the same user is prohibited from accessing the software regardless of the machine ID for the second and consequent accesses.

9: Free of charge

The software is always provided free of charge regardless of the user ID and machine ID. It is provided free of charge even if the value of the price field is other than 0.

10: The identical user is charged, with a suitable message, for the software for the second access regardless of the machine ID.

That is, the user is charged, without a message, for the software for the first access. The user is presented only with the message for the second access, but it is not inquired whether or not he or she purchases the software.

11: The message is output for the first purchase, and the user is inquired as to whether or not he or she purchases the software, even for the first access.

That is, the message is output for each access regardless of the user ID or machine ID, to inquire as to whether or not the user purchases the software. If the user is prohibited from accessing the software, a message indicating "The software cannot be deciphered. Send mail to XXXX (XXXX=SHB00906)." is output.

The contents for the re-sales type are as follows.

1: re-saleable.

0: not re-saleable.

The contents of the urgent sales stop are as follows.

1: urgent sales stop

0: no urgent sales stop

FIG. 23 shows a record of the purchase history table. The table name is TB PURCHASE LOG, and the table is used in making a check when the software is accessed by a plurality of users with the same NIFTY-ID or the same machine ID. It is also used for displaying the purchased software. This table is added to/deleted from during the operation. In FIG. 23, the purchase amount is recorded when the software is purchased.

FIG. 24 shows a record of the active customer table. The table name is TABLE TB ACTIVE CUSTOMER, and the table is used in making the black list check at the time of logging-in. It is also used in helping inputting data through the keyboard. For example, the known data such as a name, etc. is retrieved from this table at the second access. This table is added to/deleted from during the operation. The active customer table is required in checking the maximum monthly account value. If the monthly total exceeds the account limit, it is determined to be NG.

In FIG. 24, the contents of the credit flag are as follows.

If 'B' is set, then the user is referred to as a black listed customer and the sale is prohibited.

If '0' is set, the amount of the standard limit is not exceeded. If the accumulative purchase amount for the current month does not exceed the value set for the credit limit, then the sales is permitted. The total of the ordered products plus the purchase amount for the current month is determined to be the accumulative purchase amount for the current month.

If '1' is set, the user is referred to as an executive customer. If the accumulative purchase amount for the current month does not exceed the value set for the item of the credit limit, the sales is permitted. The program is executed as in the case of '0'.

If 'T' is set, then the user is referred to as a test ID customer without credit limit. Therefore, the normal accounting process is not applied to this user.

The receiving unit 34 switches the credit limit depending on the user according to the credit limit switch date. The credit limit is switched at 00:00 of the credit limit switch date. If the credit limit switch date is 0, then the old credit limit amount is adopted, and the purchase amount switch date is not applied. The purchase amount for the current month and the purchase amount for the previous month are copied by a process called CRON on the specified date. The purchase amount for the current month is set to 0. When the number of models exceeds 5, one of the models is sequentially rewritten.

FIG. 25 shows a record of the accounting log table. The table name is TB CHARGE LOG, and the table is passed to EDP. If the software has already been purchased, the purchase amount is passed as '−1'. If the software is provided free of charge, then '0' is passed as the purchased amount. This table is added to/deleted from during the operation.

FIG. 26 shows a record of the error log table. The table name is TABLE TB ERROR LOG, and the table is used in monitoring errors. This table is added to/deleted from during the operation.

In FIG. 26, the contents of the cause of an error are as follows.

1: black list
2: ID error
3: parse error
4: no corresponding software
5: illegal maximum accounting value
6: urgent stop access
7: sales period (including re-sales) error
8: illegal sales form
9: key generation error
10: key confirmation error
11: other system error FIG. 27 shows a record of the access log table. The table name is TABLE TB ACCESS LOG, and the table is used in obtaining statistical data of accesses to the CD-ROM deciphering center 31.

In the above described embodiments, a CD-ROM is used as an enciphered storage medium. However, the present invention is also applicable to other storage media that can be enciphered-by a sales agent. In such cases, the user sends an order file describing the identifier of a product on the storage medium, an access number, etc. to the deciphering center. The deciphering center notifies the user of the corresponding key. The other storage media can be, for example, a floppy disk, memory card, magnetic disk, optical disk, magneto-optical disk, etc.

Furthermore, the information stored on an enciphered storage medium can be image data, music data, software program, and any other software information.

According to the present invention, the information stored on an enciphered storage medium, such as a CD-ROM, etc. distributed to the users, can be provided online. At this time, the user is provided with various services including the decryption of the information on the storage medium while communicating with the deciphering center in an interactive mode.

What is claimed is:

1. An online deciphering system comprising:
    a communicating device transmitting information to and from a user terminal unit through a communications network; and
    an interactive device providing menu information of an interactive mode to the user terminal unit and selecting a stored information from a plurality of information, said menu information including information indicating whether enciphered information on a storage medium of a user corresponds to a previous version of the stored information and allowing the user to stop online deciphering when the enciphered information corresponds to the previous version, and online releasing the enciphered information from a cryptogram according to order information received from the user terminal unit in the interactive mode,
    wherein a machine specific machine identification number of the user terminal is transmitted from the user terminal unit through the communicating device to a key generating device connected to the interactive device, the key generating device enciphering a key using the machine specific identification number and transmitting the enciphered key to the user terminal unit, the key being used by the user terminal unit to decipher the selected stored information.

2. The online deciphering system according to claim 1, wherein
    said interactive means online transmits a first key information for use in accessing information stored on the storage medium to the user terminal unit through said communicating device according to the order information.

3. The online deciphering system according to claim 2, further comprising:
    an information storage device storing a second key information specific to the information stored on the storage medium, wherein
    said interactive device searches said information storage device according to the order information, retrieves the second key information corresponding to ordered information specified by the order information, and transmits to the user terminal unit the first key information generated using the second key information.

4. The online deciphering system according to claim 3, wherein:
    the key generating device generating the first key information based on the second key information and user terminal unit identification information contained in the order information.

5. The online deciphering system according to claim 3, wherein:
    the key generating device generating the first key information based on the second key information and user identification information contained in the order information.

6. The online deciphering system according to claim 3, wherein:
    the key generating device generating the first key information based on the user identification information, the user terminal unit identification information, and the second key information.

7. The online deciphering system according to claim 2, wherein
    said interactive device receives the order information from the user terminal, and transmits the first key information to the user terminal by electronic mail.

8. The online deciphering system according to claim 2, wherein
    said interactive device instructs the user to input the first key information transmitted to the user terminal unit and confirms input key information.

9. The online deciphering system according to claim 1, wherein said storage medium is a compact disc read only memory.

10. The online deciphering system according to claim 1, wherein
    said interactive device receives the order information comprising a plurality of items from the user terminal unit in a file format.

11. The online deciphering system according to claim 1, wherein
said interactive device receives the order information comprising a plurality of items from the user terminal unit through manual input.

12. The online deciphering system according to claim 11, wherein
said interactive device allows the user to omit inputting known items from among the plurality of items contained in the order information.

13. The online deciphering system according to claim 1, further comprising:
an information storage device storing a comment for each piece of information stored on the storage medium, wherein
said interactive device outputs a message for each piece of information stored on the storage medium.

14. A terminal device, comprising:
a device mounting an enciphered storage medium;
an order output device accessing a deciphering center through a communications network, selecting information stored on the enciphered storage medium from a plurality of information, according to menu information of an interactive mode provided by the deciphering center, said menu information including information indicating whether enciphered information on the storage medium corresponds to a previous version of the stored information and allowing a user to stop online deciphering when the enciphered information corresponds to the previous version, and outputting order information to the deciphering center; and
a deciphering device online receiving key information for use in accessing the selected information from the enciphered storage medium in the interactive mode, and accessing the selected information on the enciphered storage medium according to the key information,
wherein a machine specific machine identification number of a terminal of the user is transmitted from the user terminal to a key generating device, the key generating device enciphering a key using the machine specific identification number and transmitting the enciphered key as key information to the user terminal, the key information being used by the user terminal to decipher the selected information.

15. The terminal device according to claim 14, wherein said order output device outputs the order information comprising a plurality of items in a file format.

16. The terminal device according to claim 14, wherein said order output device outputs the order information comprising a plurality of items one item at a time.

17. The terminal device according to claim 14, wherein
said deciphering device automatically reads a file storing the first key information received from the deciphering center, and extracts the first key information from the file.

18. The terminal device according to claim 17, wherein said deciphering device further comprises an automatic piloting device automatically storing in the file the first key information received from the deciphering center.

19. A computer-readable storage medium storing a program to direct a computer to perform:
accessing a deciphering center through a communications network, selecting information stored on an enciphered storage medium from a plurality of information, according to menu information of an interactive mode provided by the deciphering center, said menu information including information indicating whether enciphered information on the storage medium corresponds to a previous version of the stored information and allowing a user to stop online deciphering when the enciphered information corresponds to the previous version, and outputting order information to the deciphering center;
online receiving key information for use in accessing the selected information on the enciphered storage medium in the interactive mode, and accessing the selected information on the enciphered storage medium according to the key information; and
enciphering the key information using a machine specific machine identification number of a terminal of the user and transmitting the enciphered key information to the terminal where the terminal deciphers the key information to decipher the selected information.

20. A computer-readable storage medium storing a program to direct a computer to perform:
accessing a deciphering center through a communications network, selecting information stored on the storage medium from a plurality of information, according to menu information of an interactive mode provided by the deciphering center, said menu information including information indicating whether enciphered information on the storage medium corresponds to a previous version of the stored information and allowing a user to stop online deciphering when the enciphered information corresponds to the previous version, and outputting order information to the deciphering center; and
online receiving a key information for accessing the selected information from the storage medium in the interactive mode, and accessing the selected information on the storage medium according to the key information,
enciphering the key information using a machine specific machine identification number of a terminal of the user and transmitting the enciphered key information to the terminal where the terminal deciphers the key information to decipher the selected information.

21. An online deciphering system comprising:
a communicating device transmitting information to and from a user terminal unit through a communications network; and
an interactive device providing menu information of an interactive mode to the user terminal unit and online transmitting information required to decipher enciphered information on a storage medium of a user according to order information comprising a selection of information from a plurality of information, the order information received from the user terminal unit in the interactive mode, said menu information including information indicating whether the enciphered information on the storage medium of the user corresponds to a previous version of the stored information and allowing the user to stop online deciphering when the enciphered information corresponds to the previous version,
wherein a machine specific machine identification number of the user terminal unit is transmitted from the user terminal unit to a key generating device, the key generating device connected to the interactive device and enciphering a key using the machine specific identification number and transmitting the enciphered key as key information to the user terminal unit, the key information being used by the user terminal unit to decipher the selected information.

22. An online deciphering system for use with a communications system connecting a user terminal unit with a deciphering center through a communications network, said system comprising:

an order output device accessing the deciphering center through the communications network, selecting information stored on an enciphered storage medium from a plurality of information according to menu information of an interactive mode provided by the deciphering center, and outputting order information to the deciphering center;

an interactive device providing menu information of the interactive mode to the user terminal unit, said menu information including information indicating whether enciphered information on the storage medium corresponds to a previous version of the stored information, and online transmitting to the user terminal unit a first key information for use in accessing the selected information on the enciphered storage medium in the user terminal unit through the communications network according to the order information received from said order output device in the interactive mode; and a deciphering device accessing the selected information on the enciphered storage medium using the first key information received from said interactive device, wherein a machine specific machine identification number of the user terminal unit is transmitted from the user terminal unit to a key generating device connected to the interactive device, the key generating device enciphering a key using the machine specific identification number and transmitting the enciphered key to the user terminal unit, the key being used by the user terminal unit to decipher the selected information.

23. An online deciphering method comprising:

providing menu information of an interactive mode to a user terminal unit through a communications network, said menu information including information indicating whether enciphered information on the storage medium corresponds to a previous version of the stored information and allowing a user to stop online deciphering when the enciphered information corresponds to the previous version;

receiving order information comprising a selection of information from a plurality of information, from the user terminal unit in the interactive mode, in which the storage medium is mounted, through the communications network;

online releasing the enciphered information stored on the storage medium from a cryptogram through the communications network according to the order information; and enciphering key information used to encipher the information using a machine specific machine identification number of the user terminal unit and transmitting the enciphered key information to the user terminal unit where the use terminal unit deciphers the key information to decipher the released enciphered information.

24. The online deciphering method according to claim 23, wherein a first key information is generated for use in accessing information stored on an enciphered storage medium according to the order information received from the user terminal unit provided with the enciphered storage medium; and the first key information is online transmitted to the user terminal unit through the communications network.

25. An online deciphering method comprising:

mounting an enciphered storage medium in a user terminal unit;

accessing a deciphering center through a communications network, selecting information stored on the enciphered storage medium from a plurality of information, according to menu information of an interactive mode provided by the deciphering center, said menu information including information indicating whether enciphered information on the storage medium corresponds to a previous version of the stored information and allowing a user to stop online deciphering when the enciphered information corresponds to the previous version, and outputting order information to the deciphering center;

online receiving key information for use in accessing the selected information on the enciphered storage medium in the interactive mode through a communications network;

enciphering the key information using a machine specific machine identification number of the user terminal unit and transmitting the key information to the user terminal unit where the user terminal unit deciphers the key information to decipher the selected information; and accessing the selected information on the enciphered storage medium according to the key information.

26. An apparatus, comprising:

a computer requesting from a database a selected file from a plurality of enciphered files stored in the database, initiating deciphering of the selected file using a key, and receiving a deciphered file corresponding to the selected file;

a control device stopping the deciphering and receiving if the computer already possesses a same version of the deciphered file; and a key generating device connected to the database and receiving a machine specific identification number of the computer, the key generating device enciphering the key using the machine specific identification number and transmitting the enciphered key to the computer, the enciphered key being deciphered by the computer and then used by the computer to decipher the selected file.

27. A method, comprising:

requesting a selected file from a plurality of enciphered files stored in a database;

enciphering a key used to encipher the selected file using a machine specific identification number of a user's computer;

transmitting the enciphered key to the user's computer and deciphering the enciphered key by the user's computer;

deciphering the selected file using the deciphered key; and stopping the deciphering if a same version of the deciphered file is already present on the user's computer.

28. A computer readable storage, controlling a computer by:

requesting a selected file from a plurality of enciphered files stored in a database;

enciphering a key used to encipher the selected file using a machine specific identification number of a user's computer;

transmitting the enciphered key to the user's computer and deciphering the enciphered key by the user's computer;

deciphering the selected file using the deciphered key; and stopping the deciphering if a same version of the deciphered file is already present on the user's computer.

* * * * *

UNITED STATES PATENT AND TRADEMARK OFFICE
CERTIFICATE OF CORRECTION

PATENT NO.    : 6,523,117 B2
DATED         : February 18, 2003
INVENTOR(S)   : Hiroshi Oki et al.

It is certified that error appears in the above-identified patent and that said Letters Patent is hereby corrected as shown below:

<u>Column 17,</u>
Line 59, delete "use" and insert -- user --

Signed and Sealed this

Fifth Day of August, 2003

JAMES E. ROGAN
*Director of the United States Patent and Trademark Office*